(12) United States Patent
Matsukura

(10) Patent No.: US 9,967,484 B2
(45) Date of Patent: May 8, 2018

(54) INFRARED DETECTION APPARATUS

(71) Applicant: FUJITSU LIMITED, Kawasaki-shi, Kanagawa (JP)

(72) Inventor: Yusuke Matsukura, Isehara (JP)

(73) Assignee: FUJITSU LIMITED, Kawasaki (JP)

(*) Notice: Subject to any disclaimer, the term of this patent is extended or adjusted under 35 U.S.C. 154(b) by 234 days.

(21) Appl. No.: 15/151,544

(22) Filed: May 11, 2016

(65) Prior Publication Data
US 2016/0255292 A1 Sep. 1, 2016

Related U.S. Application Data

(63) Continuation of application No. PCT/JP2013/080869, filed on Nov. 15, 2013.

(51) Int. Cl.
| | |
|---|---|
| *H04N 5/33* | (2006.01) |
| *H04N 5/361* | (2011.01) |
| *G01J 5/28* | (2006.01) |
| *G01J 5/52* | (2006.01) |
| *H04N 5/363* | (2011.01) |
| *G01J 5/02* | (2006.01) |
| *G01J 5/00* | (2006.01) |

(52) U.S. Cl.
CPC ............ *H04N 5/361* (2013.01); *G01J 5/026* (2013.01); *G01J 5/28* (2013.01); *G01J 5/522* (2013.01);
(Continued)

(58) Field of Classification Search
CPC .......... H04N 5/361; H04N 5/363; H04N 5/33; G01J 5/026; G01J 5/28; G01J 5/522; G01J 2005/0048; G01J 2005/0077
(Continued)

(56) References Cited

U.S. PATENT DOCUMENTS

| | | | |
|---|---|---|---|
| 2007/0273775 A1 | 11/2007 | Jiang | |
| 2010/0102228 A1* | 4/2010 | Chen | G01J 1/18 250/330 |

(Continued)

FOREIGN PATENT DOCUMENTS

| | | |
|---|---|---|
| JP | 63-157020 | 6/1988 |
| JP | 03-179977 | 8/1991 |

(Continued)

OTHER PUBLICATIONS

International Search Report and Written Opinion of the International Searching Authority (Form PCT/ISA/210, Form PCT/ISA/237), mailed in connection with PCT/JP2013/080869 and dated Jan. 21, 2014 (13 pages).

(Continued)

*Primary Examiner* — Allen Wong
(74) *Attorney, Agent, or Firm* — Fujitsu Patent Center

(57) ABSTRACT

An infrared detection apparatus includes an infrared detector configured to output an electric signal corresponding to an inputted infrared ray, and a signal processor configured to compensate for a variation of the electric signal, which is outputted from the infrared detector, caused by variation of an operation temperature with a value indicating a variation of a dark current equivalent component by the operation temperature variation when becoming a second operation temperature after the operation temperature variation, the dark current equivalent component including a first dark current equivalent component calculated using a first electric signal and a second electric signal outputted from the infrared detector when infrared rays having intensities equivalent to blackbodies of a first known temperature and a second known temperature are inputted at a first operation temperature.

10 Claims, 12 Drawing Sheets

(52) U.S. Cl.
CPC ............ *H04N 5/33* (2013.01); *H04N 5/363* (2013.01); *G01J 2005/0048* (2013.01); *G01J 2005/0077* (2013.01)

(58) Field of Classification Search
USPC .......................................................... 348/164
See application file for complete search history.

(56) References Cited

U.S. PATENT DOCUMENTS

| | | | | |
|---|---|---|---|---|
| 2010/0294933 | A1* | 11/2010 | Stratmann | H04N 5/33 250/330 |
| 2012/0177083 | A1* | 7/2012 | Lin | G01J 5/0022 374/121 |

FOREIGN PATENT DOCUMENTS

| | | |
|---|---|---|
| JP | 04-286477 | 10/1992 |
| JP | 06-221914 | 8/1994 |
| JP | 10-013749 | 1/1998 |
| JP | 2001-268440 | 9/2001 |
| JP | 2002-043610 | 2/2002 |
| JP | 2004-095692 | 3/2004 |
| JP | 2012-175408 | 9/2012 |

OTHER PUBLICATIONS

JPOA—Office Action for Japanese Patent Application No. 2015-547346 dated Jan. 10, 2017, with full Machine Translation.

* cited by examiner

INFRARED DETECTION APPARATUS

CROSS-REFERENCE TO RELATED APPLICATION

This application is a continuation application of International Application PCT/JP2013/080869 filed on Nov. 15, 2013 and designated the U.S., the entire contents of which are incorporated herein by reference.

FIELD

The embodiments discussed herein are related to an infrared detection apparatus.

BACKGROUND

Conventionally, an infrared detection apparatus including an infrared detector that outputs an electric signal corresponding to an inputted infrared ray is available.

As such an infrared detection apparatus as just described, for example, a Focal Plane Array (FPA) type infrared detection apparatus in which infrared detectors are arrayed two-dimensionally is available.

Further, an infrared detection apparatus in which, when an operation temperature varies and a dark current equivalent component varies, compensation can be performed using a dummy detector to which an infrared ray is blocked is available.

SUMMARY

According to an aspect of the embodiment, an infrared detection apparatus of the technology disclosed herein includes an infrared detector configured to output an electric signal corresponding to an inputted infrared ray, and a signal processor configured to compensate for a variation of the electric signal, which is outputted from the infrared detector, caused by variation of an operation temperature with a value indicating a variation of a dark current equivalent component by the operation temperature variation when becoming a second operation temperature after the operation temperature variation, the dark current equivalent component including a first dark current equivalent component calculated using a first electric signal and a second electric signal outputted from the infrared detector when infrared rays having intensities equivalent to blackbodies of a first known temperature and a second known temperature are inputted at a first operation temperature.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

However, if the operation temperature varies, then dark current principally of an infrared detector varies and an electric signal outputted from the infrared detector varies.

Further, when compensation is performed using a dummy detector to which an infrared ray is blocked as described above, since it is difficult to fully block an infrared ray, it is difficult to perform compensation with high accuracy.

Therefore, it is demanded to perform compensation for an electric signal outputted from the infrared detector with high accuracy even if the operation temperature varies.

In the following, an infrared detection apparatus according to the present embodiment is described with reference to FIGS. 1 to 12.

Figure 1:
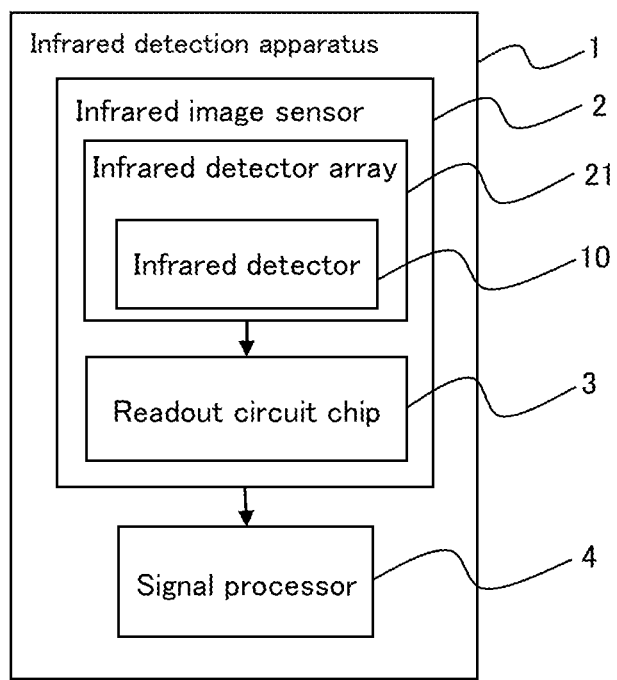
FIG. 1 is a view depicting a configuration of an infrared detection apparatus according to an embodiment.
Figure 2:
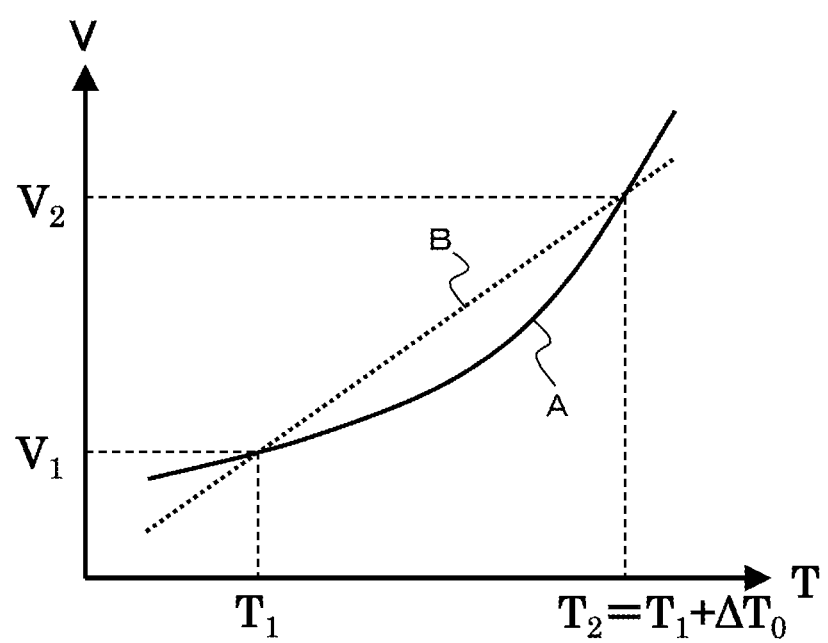
FIG. 2 is a view illustrating a subject of the present embodiment.

In the present embodiment, as depicted in FIG. 1, an infrared detection apparatus 1 includes an infrared detector (infrared photodetector) 10 that outputs an electric signal corresponding to an inputted infrared ray and a signal processor 4 that processes the electric signal outputted from the infrared detector 10. It is to be noted that the infrared detection apparatus 1 is hereinafter referred to sometimes as infrared detection device or infrared imaging apparatus.

Further, the infrared detector 10 is hereinafter referred to sometimes as infrared reception device (element). Further, the signal processor 4 is hereinafter referred to sometimes as signal calculation unit or controlling calculation unit.

Particularly, in the present infrared detection apparatus 1, the signal processor 4 compensates for a variation of an electric signal (here, voltage; output voltage) outputted from the infrared detector 10 caused by an operation temperature variation in accordance with a value indicative of a variation of a dark current equivalent component caused by an operation temperature variation when a second operation temperature is exhibited after the operation temperature variation. It is to be noted that the dark current equivalent component is a component caused by dark current.

Here, the value indicative of a variation of a dark current equivalent component caused by an operation temperature variation includes a first dark current equivalent component determined using a first electric signal and a second electric signal outputted from the infrared detector 10 when infrared rays having intensities corresponding to blackbodies of a first known temperature and a second known temperature are inputted at a first operation temperature.

The present embodiment is described in detail below.

First, if an actual input-output characteristic (input light-output signal characteristic) of the infrared detector 10 can be found accurately, then an electric signal outputted from the infrared detector 10 can be compensated for with high accuracy even if the operation temperature varies.

For example, when the electric signal outputted from the infrared detector 10 is to be corrected, an infrared ray having a known intensity is inputted to the infrared detector 10 using each of two infrared sources to acquire an electric signal outputted from the infrared detector 10 at this time. Therefore, if it is recognized based on the signals that an actual input-output characteristic of the infrared detector 10 varies as indicated, for example, by a solid line A in FIG. 2, then a dark current equivalent component of the electric signal outputted from the infrared detector 10 can be determined. In particular, if it is recognized that the actual input-output characteristic of the infrared detector 10 varies as indicated by the solid line B, then a dark current equivalent component of the electric signal outputted from the infrared detector 10 can be determined by determining an electric signal V outputted from the infrared detector 10 when extrapolation is performed down to the temperature T=0 (infrared intensity 0). The electric signal outputted from the infrared detector 10 can be compensated for with high accuracy using the dark current equivalent component, determined in such a manner as described above, of the electric signal outputted from the infrared detector 10. On the other hand, if it is assumed that the input-output characteristic of the infrared detector 10 exhibits a linear variation as indicated by a solid line A in FIG. 2, then it is difficult to determine a dark current equivalent component of the electric signal outputted from the infrared detector 10 with high accuracy based on the input-output characteristic. Therefore, if the operation temperature varies, then it is difficult to compensate for the electric signal outputted from the infrared detector 10.

Here, with respect to the temperature T of the target object, the intensity of an infrared ray irradiated from the object and the electric signal output (voltage corresponding to optical current) corresponding to the infrared intensity of the infrared detector 10 at this time are represented as f(T) and $V_p$, respectively. If the temperature of the target object varies from T to T+dT, then the variation of the infrared intensity radiated from the object is f(T) dT, and, accordingly, the variation $dV_p$ of the electric signal output of the infrared detector 10 can be represented by the following expression:

$$\frac{dV_p}{dT} = f(T)V_p$$

The solution to the differential equation above is given, where an integration constant is represented by C, by:

$$\frac{dV_p}{dT} = f(T)V_p \Leftrightarrow V_p = C \exp\left\{\int f(T)dT\right\}$$

Accordingly, if a function form of f(T) can be determined in such a form that it can analytically implement and integration operation, then the actual input-output characteristic of the infrared detector 10 can be determined accurately and the electric signal outputted from the infrared detector 10 can be compensated for even if the operation temperature varies.

The inventor of the present technology found that the function f(T) can be determined by an expression given below through a derivation process hereinafter described. It is to be noted that the function f(T) represented by the following expression is hereinafter referred to sometimes as F(T) or $\langle \partial W/\partial T \rangle$ for distinguishing the same from an approximate function f(T) hereinafter described.

$$f(T) = \left\langle \frac{\partial W}{\partial T} \right\rangle_\lambda = \frac{\int_{\lambda_1}^{\lambda_2} R_0(\lambda)\frac{\partial W}{\partial T} d\lambda}{\int_{\lambda_1}^{\lambda_2} R_0(\lambda)W(\lambda, T) d\lambda}$$

If the function f(T) is approximated using a real constant x through a derivation process of an approximate expression hereinafter described, then an expression given below is obtained. It is to be noted that the function f(T) represented by the following expression is hereinafter referred to as approximate function f(T).

$$f(T) = \frac{hc}{x\lambda_p k_B T^2}$$

Then, if the function f(T) is approximated to such a form as given above, then where the integration constant is represented by $V_O$, from the following expression:

$$\frac{dV_p}{dT} = f(T)V_p \Leftrightarrow V_p = V_0 \exp\left\{\int f(T)dT\right\}$$

such an expression as given below is derived:

$$V_p = V_0 \exp\left\{-\frac{hc}{x\lambda_p k_B T}\right\}$$

Further, an electric signal $V_{DC}$ outputted from the infrared detector 10 is determined, by adding a dark current equivalent component (dark current equivalent output component) $V_d$, by $$V_{DC} = V_p + V_d = V_0 \exp\left(-\frac{hc}{x\lambda_p k_B T}\right) + V_d$$

This expression includes two unknown coefficients of $V_0$ and $V_d$ except for universal physical constants (h, c, $k_B$) and $x\lambda_p$ that is determined separately. Therefore, electric signals $V_{DC}$ outputted from the infrared detector 10 when infrared rays having intensities corresponding to blackbodies of known temperatures $T_1$ and $T_2$ ($T_2 > T_1$) different from each other are represented as $V_1$ and $V_2$, respectively, and, if the electric signals are found, then the unknown coefficients $V_0$ and $V_d$ can be determined uniquely as a solution to the simultaneous equations to which the expression given above is applied.

In particular, the unknown coefficient $V_d$ can be determined in the following manner.

First, if an electric signal $V_1$ outputted with respect to the known temperature $T_1$ is substituted and an electric signal $V_2$ outputted with respect to the known temperature $T_2$ is substituted into the expression given above, then two equalities given below are obtained.

$$V_1 = V_0 \exp\left\{-\frac{hc}{x\lambda_p k_B T_1}\right\} + V_d$$

$$V_2 = V_0 \exp\left\{-\frac{hc}{x\lambda_p k_B T_2}\right\} + V_d$$

If the upper side expression is multiplied by the following expression:

$$\exp\left\{-\frac{hc}{x\lambda_p k_B T_2}\right\}$$

and the lower side expression is multiplied by the following expression:

$$\exp\left\{-\frac{hc}{x\lambda_p k_B T_1}\right\}$$

and then subtraction is performed at both sides, then the unknown coefficient $V_d$ can be determined as given below.

$$V_1 \exp\left\{-\frac{hc}{x\lambda_p k_B T_2}\right\} =$$
$$V_0 \exp\left\{-\frac{hc}{x\lambda_p k_B T_1}\right\} \exp\left\{-\frac{hc}{x\lambda_p k_B T_2}\right\} + V_d \exp\left\{-\frac{hc}{x\lambda_p k_B T_2}\right\}$$

$$V_2 \exp\left\{-\frac{hc}{x\lambda_p k_B T_1}\right\} =$$
$$V_0 \exp\left\{-\frac{hc}{x\lambda_p k_B T_1}\right\} \exp\left\{-\frac{hc}{x\lambda_p k_B T_2}\right\} + V_d \exp\left\{-\frac{hc}{x\lambda_p k_B T_1}\right\}$$

$$\therefore V_1 \exp\left\{-\frac{hc}{x\lambda_p k_B T_2}\right\} - V_2 \exp\left\{-\frac{hc}{x\lambda_p k_B T_1}\right\} =$$
$$V_d \left[\exp\left\{-\frac{hc}{x\lambda_p k_B T_2}\right\} - \exp\left\{-\frac{hc}{x\lambda_p k_B T_1}\right\}\right]$$

$$\therefore V_d = \frac{V_1 \exp\left\{-\frac{hc}{x\lambda_p k_B T_2}\right\} - V_2 \exp\left\{-\frac{hc}{x\lambda_p k_B T_1}\right\}}{\exp\left\{-\frac{hc}{x\lambda_p k_B T_2}\right\} - \exp\left\{-\frac{hc}{x\lambda_p k_B T_1}\right\}}$$

Similarly, also the unknown coefficient $V_0$ can be determined in the following manner.

$$V_0 = \frac{V_2 - V_1}{\exp\left(-\frac{hc}{x\lambda_p k_B T_2}\right) - \exp\left(-\frac{hc}{x\lambda_p k_B T_1}\right)}$$

Incidentally, a value of $x\lambda_p$ can be calculated in the following manner.

First, $\lambda_p$ represents a peak wavelength in a wavelength response characteristic $R_0(\lambda)$ of the infrared detector. Thus, the wavelength response characteristic $R_0(\lambda)$ of the infrared detector can be approximated to a form given below using a suitable constant s.

$$R_0(\lambda) = \exp\left\{-\frac{(\lambda - \lambda_p)^2}{s^2}\right\}$$

and is a peak wavelength at this time.

Therefore, $\lambda_p$ may be determined from a result of actual measurement, for example, of the infrared detector itself or a pilot detector having a same specification and produced separately.

Then, the real constant x may be determined in the following manner.

First, for example, as well known, $R_0(\lambda) = \exp(-9) \sim 1.234 \times 10^{-4}$ with respect to $\lambda = \lambda_p \pm 3$ s is sufficiently low with respect to its maximum value 1. Therefore, it is considered that really $R_0(\lambda) = 0$ in an integration range at the outer side of $\lambda = \lambda_p \pm 3$ s.

Therefore, the following inequality is satisfied:

$$\frac{1}{\lambda_p - 3s} \int_{\lambda_1}^{\lambda_2} R_0(\lambda) W(\lambda, T) d\lambda \le$$
$$\int_{\lambda_1}^{\lambda_2} \frac{1}{\lambda} R_0(\lambda) W(\lambda, T) d\lambda \le \frac{1}{\lambda_p - 3s} \int_{\lambda_1}^{\lambda_2} R_0(\lambda) W(\lambda, T) d\lambda$$

Accordingly, the real constant x described above will be found within a range that satisfies:

$$\frac{1}{\lambda_p + 3s} \le \frac{1}{x\lambda_p} \le \frac{1}{\lambda_p - 3s} \Leftrightarrow 1 - \frac{3s}{\lambda_p} \le x \le 1 + \frac{3s}{\lambda_p}$$

Here, if a full width at half maximum (FWHM) of the wavelength response characteristic $R_0(\lambda)$ of the infrared detector 10 is taken into consideration, then the following expression is obtained by solving the expression for A at $R_0(\lambda) = 0.5$:

$$FWHM = 2s\sqrt{Ln(2)} \Leftrightarrow s = \frac{FWHM}{2\sqrt{Ln(2)}}$$

Therefore, the range of the real constant x is given by:

$$1 - \frac{3FWHM}{2\text{Ln}(2)\lambda_p} \leq x \leq 1 + \frac{3FWHM}{2\text{Ln}(2)\lambda_p}$$

Accordingly, the real constant x may be determined within a range that satisfies the condition just described.

It is to be noted that the determination method for the real constant x is not limited to this.

For example, also it is possible to determine a value of the real constant x in the following manner. In particular, the wavelength response characteristic $R_0(\lambda)$ is obtained from a result of actual measurement of the infrared detector itself, a pilot detector having a same specification and produced separately or the like and, a technique such as a numerical calculation (numerical integration) is used such that, where the wavelength band of an infrared ray is from $\lambda_1$ to $\lambda_2$, the infrared intensity is represented by W, the temperature is represented by T and the wavelength dispersion characteristic of a blackbody radiation intensity of the temperature T is represented by $W(\lambda, T)$, a value is actually calculated by the function f(T) represented by $$F(T) = \left\langle \frac{\partial W}{\partial T} \right\rangle_\lambda = \frac{\int_{\lambda_1}^{\lambda_2} R_0(\lambda) \frac{\partial W}{\partial T} d\lambda}{\int_{\lambda_1}^{\lambda_2} R_0(\lambda) W(\lambda, T) d\lambda}$$

and then a value calculated by an approximate function f(T) represented by $$f(T) = \frac{hc}{x\lambda_p k_B T^2}$$

is fitted to the actually calculated value to determine the value of the real constant x.

Incidentally, the unknown coefficient $V_d$ can be determined in such a manner as described above. Therefore, the signal processor 4 calculates a first dark current equivalent component $V_{d1}$ of an electric signal outputted from the infrared detector 10 at the first operation temperature, using the first electric signal $V_1$ and the second electric signal $V_2$ outputted from the infrared detector 10 when infrared rays having intensities corresponding to blackbodies of the first known temperature $T_1$ and the second known temperature $T_2$ ($T_2 > T_1$) are inputted at the first operation temperature, by:

$$V_{d1} = \frac{V_1 \exp\left(-\frac{hc}{x\lambda_p k_B T_2}\right) - V_2 \exp\left(-\frac{hc}{x\lambda_p k_B T_1}\right)}{\exp\left(-\frac{hc}{x\lambda_p k_B T_2}\right) - \exp\left(-\frac{hc}{x\lambda_p k_B T_1}\right)}$$

In this case, the signal processor 4 calculates the first dark current equivalent component using a relational expression in which not a constant but a function of the temperature (namely, a function that uses the temperature as a variable) is included at a portion thereof relating to the dependency of the infrared intensity on the temperature.

Here, the relational expression is represented by an expression given below where the electric signal corresponding to the infrared intensity outputted from the infrared detector 10 is represented by $V_p$, the variation of the electric signal corresponding to the infrared intensity outputted from the infrared detector 10 when the temperature variation is represented as dT is represented by $dV_p$ and the portion relating to the dependency of the infrared intensity on the temperature is represented by f(T) that is a function of the temperature T (function that uses T as a variable). It is to be noted that the function f(T) is hereinafter referred to sometimes as function representing the dependency of the infrared intensity on the temperature.

$$\frac{dV_p}{dT} = f(T) V_p$$

Here, the function f(T) of the temperature T included in the portion of the relational expression relating to the dependency of the infrared intensity on the temperature is represented by an expression given below where the wavelength band of an infrared ray is represented by $\lambda_1$ to $\lambda_2$, the infrared intensity is represented by W, the temperature is represented by T, the wavelength response characteristic of the infrared detector 10 is represented by $R_0(\lambda)$ and the wavelength dispersion characteristic of the blackbody radiation intensity of the temperature T is represented by $W(\lambda, T)$. It is to be noted that the wavelength response characteristic is hereinafter referred to sometimes as wavelength dispersion, spectral characteristic or standardized spectral response characteristic. Further, the function f(T) represented by the expression given below is hereinafter referred to sometimes as F(T) or $\langle \partial W / \partial T \rangle$ in order to distinguish the function f(T) from an approximate function f(T) hereinafter described.

$$f(T) = \frac{\int_{\lambda_1}^{\lambda_2} R_0(\lambda) \frac{\partial W}{\partial T} d\lambda}{\int_{\lambda_1}^{\lambda_2} R_0(\lambda) W(\lambda, T) d\lambda}$$

If the expression is approximated, then a result of the approximation is represented by an expression given below where a peak wavelength in a wavelength response characteristic of the infrared detector 10 is represented by $\lambda_p$, a real coefficient is represented by x, the Boltzmann's constant is represented by $k_B$, the Planck's constant is represented by h and the speed of light in vacuum is represented by c. It is to be noted that the function f(T) represented by the following expression is hereinafter referred to as approximate function f(T).

$$f(T) = \frac{hc}{x\lambda_p k_B T^2}$$

In this case, it is preferable to set the real coefficient x, where the full width at half maximum in a wavelength response characteristic of the infrared detector 10 is represented by FWHM, with respect to the temperature (arbitrary temperature) T that satisfies the following expression:

$$\frac{hc}{\lambda_p k_B T} > 1$$

so as to fall within a range represented by:

$$1 - \frac{3FWHM}{2\mathrm{Ln}(2)\lambda_p} \leq x \leq 1 + \frac{3FWHM}{2\mathrm{Ln}(2)\lambda_p}$$

Incidentally, a relationship between the first dark current equivalent component $V_{d1}$ of the electric signal outputted from the infrared detector 10 at the first operation temperature and a second dark current equivalent component $V_{d2}$ of the electric signal outputted from the infrared detector 10 at the second operation temperature after operation temperature variation, namely, the relationship $\Delta V_2 = V_{d2}/V_{d1}$, can be represented by the following expression using a function $h(T_D)$ representing an operation temperature $T_D$ dependency of the dark current equivalent component:

$$\frac{V_{d2}}{V_{d1}} = \frac{h(T_{D2})}{h(T_{D1})}$$

or can be represented by the following expression obtained by linearization of the expression above in the proximity of the first operation temperature $T_{D1}$:

$$\frac{V_{d2}}{V_{d1}} = \frac{h(T_{D2})}{h(T_{D1})} \approx \frac{h(T_{D1}) + h'(T_{D1})(T_{D2} - T_{D1})}{h(T_{D1})} = 1 + \frac{h'(T_{D1})}{h(T_{D1})}(T_{D2} - T_{D1})$$

where $h'(T)$ represents a derivative with respect to T of the function $h(T)$.

Therefore, the signal processor 4 calculates a value $V_{d2} - V_{d1}$ indicating a variation (here, a variation amount) of the dark current equivalent component by an operation temperature variation when the operation temperature varies from the first operation temperature $T_{D1}$ to the second operation temperature $T_{D2}$ by the following expression using the function $h(T_D)$ representing the operation temperature $T_D$ dependency of the dark current equivalent component.

$$V_{d2} - V_{d1} = V_{d1}\left(\frac{h(T_{D2})}{h(T_{D1})} - 1\right)$$

or calculates the value $V_{d2} - V_{d1}$ by the following expression obtained by linearization in the proximity of the first operation temperature $T_{D1}$.

$$V_{d2} - V_{d1} = V_{d1}\frac{h'(T_{D1})}{h(T_{D1})}(T_{D2} - T_{D1})$$

Here, the function $h(T_D)$ representing the operation temperature $T_D$ dependency of the dark current equivalent component may be represented, where activation energy of dark current is represented by $E_a$, by:

$$h(T_D) = \exp\left(-\frac{E_a}{k_B T_D}\right)$$

This is based on a logical expression given below of a current variation caused by thermal radiation.

$$h(T_D) \propto \exp\left(-\frac{E_a}{k_B T_D}\right)$$

Further, the function $h(T_D)$ representing the operation temperature $T_D$ dependency of the dark current equivalent component may be represented, where activation energy of dark current is represented as $E_a$, by:

$$h(T_D) = T_D \exp\left(-\frac{E_a}{k_B T_D}\right)$$

This is based on a logical expression given below of dark current relating to a quantum well type infrared detector.

$$h(T_D) \propto T_D \exp\left(-\frac{E_a}{k_B T_D}\right)$$

Further, the function $h(T_D)$ representing the operation temperature $T_D$ dependency of the dark current equivalent component may be a function determined using one dark current equivalent component of an electric signal outputted from the infrared detector 10 at one operation temperature and the other dark current equivalent component of an electric signal outputted from the infrared detector 10 at the other operation temperature.

Here, the one dark current equivalent component of an electric signal outputted from the infrared detector 10 at one operation temperature may be determined at the one operation temperature using a first electric signal and a second electric signal outputted from the infrared detector 10 when infrared rays of the intensities corresponding to blackbodies of a first known temperature and a second known temperature are inputted. Meanwhile, the other dark current equivalent component of an electric signal outputted from the infrared detector 10 at the other operation temperature may be determined at the other operation temperature using a first electric signal and a second electric signal outputted from the infrared detector 10 when infrared rays of the intensities corresponding to blackbodies of the first known temperature and the second known temperature are inputted.

For example, the one dark current equivalent component of an electric signal outputted from the infrared detector 10 at the one operation temperature and the other dark current equivalent component of an electric signal outputted from the infrared detector 10 at the other operation temperature may be determined, where the first known temperature is represented as $T_1$, the second known temperature is represented as $T_2$ ($T_2 > T_1$), the first electric signal is represented as $V_1$ and the second electric signal is represented as $V_2$ by the following expression, by:

$$V_d = \frac{V_1\exp\left(-\frac{hc}{x\lambda_p k_B T_2}\right) - V_2\exp\left(-\frac{hc}{x\lambda_p k_B T_1}\right)}{\exp\left(-\frac{hc}{x\lambda_p k_B T_2}\right) - \exp\left(-\frac{hc}{x\lambda_p k_B T_1}\right)}$$

Figure 3:
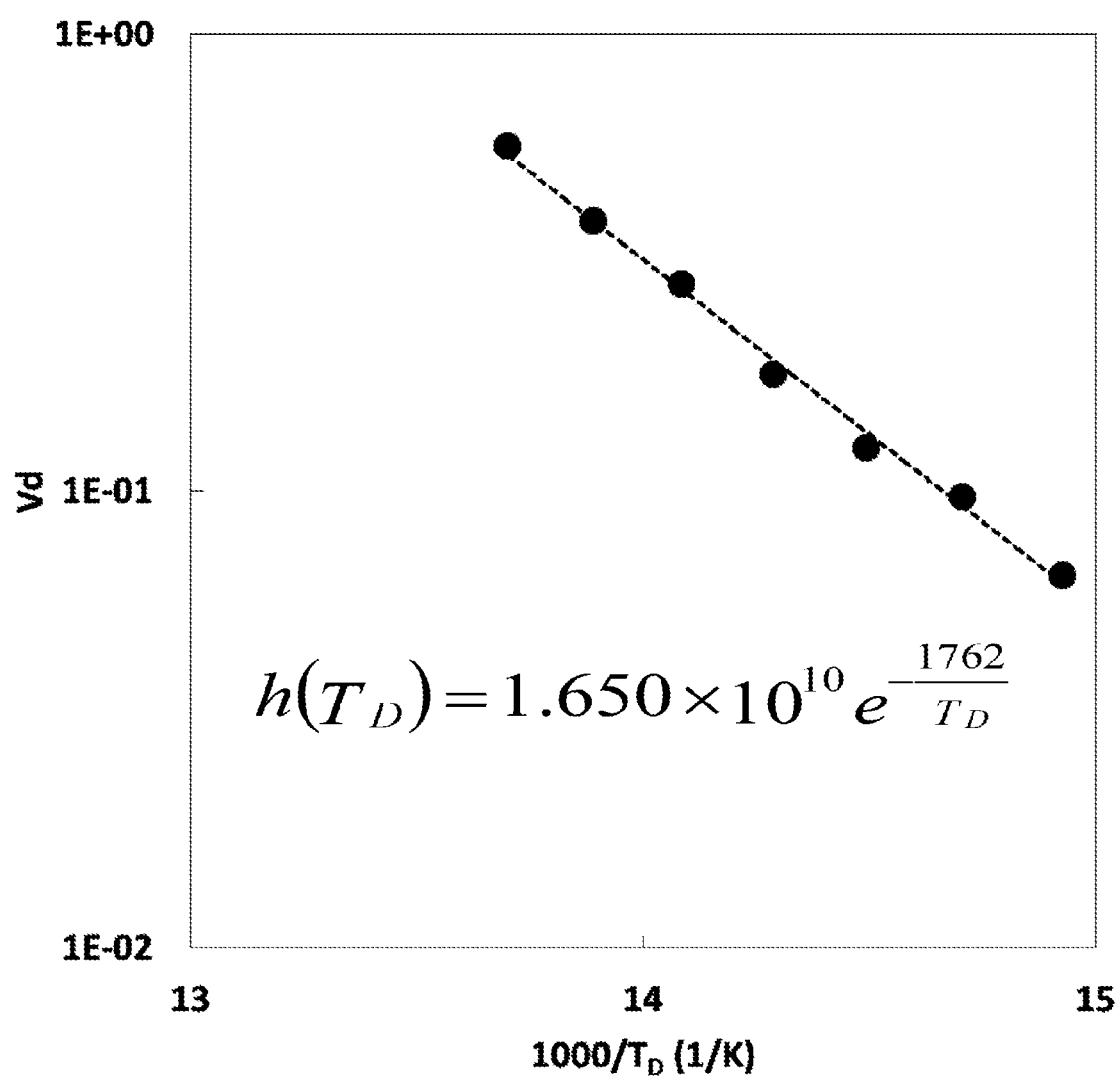
FIG. 3 is a view illustrating an example of a function $h(T_D)$ representing an operation temperature $T_D$ dependency of a dark current equivalent component.

In particular, the function $h(T_D)$ representing the operation temperature $T_D$ dependency of the dark current equivalent component may be determined by intentionally varying the operation temperature to determine the dark current equivalent component of an electric signal actually outputted from the infrared detector 10 at each of operation temperatures and associate the operation temperature $T_D$ and the dark current equivalent component $V_d$ with each other, for example, as depicted in FIG. 3.

It is to be noted that the function $h(T_D)$ representing the operation temperature $T_D$ dependency of the dark current equivalent component may be used commonly for all infrared detectors 10 or the function $h(T_D)$ that differs for each infrared detector or for each infrared detector group that includes a suitable number of infrared detectors may be used.

The signal processor 4 compensates for a variation (fluctuation) of an electric signal outputted from the infrared detector 10, which is caused by the operation temperature variation (operation temperature fluctuation) based on a value indicating a variation of the dark current equivalent component arising from the operation temperature variation including the first dark current equivalent component $V_{d1}$ determined in such a manner as described above.

Here, electric signals outputted from the infrared detector 10 when infrared rays having an equal intensity are inputted at the first operation temperature $T_{D1}$ and the second operation temperature $T_{D2}$ are represented as $V_{D1}$ and $V_{D2}$, respectively Further, a light current equivalent component (component caused by light current; since it is assumed here that infrared rays having an equal intensity are inputted, the component is fixed) of an electric signal outputted from the infrared detector 10 when an infrared ray having an equal intensity is inputted is determined as $V_P$. Further, $V_{d2}/V_{d1}$ is determined as $\Delta V_d$. It is to be noted that it is assumed that the sensitivity of the infrared detector 10 does not vary or can be ignored at the operation temperatures, namely, within the operation temperature range. In this case, electric signals $V_{D1}$ and $V_{D2}$ can be represented by the following expression:

$$V_{D1} = V_p + V_{d1}, V_{D2} = V_p + V_{d2} \Rightarrow V_{D2} =$$

$$V_{D1} + (V_{d2} - V_{d1}) = V_{D1} + V_{d1}\left(\frac{V_{d2}}{V_{d1}} - 1\right) = V_{D1} + V_{d1}(\Delta V_d - 1)$$

Here, the signal processor 4 compensates for a variation of an electric signal outputted from the infrared detector 10 by the operation temperature variation by subtracting the value [for example, a variation amount $V_{d2}-V_{d1}$, $V_{d1}(V_{d2}/V_{d1}-1)$ or $V_{d1}(\Delta V_d-1)$] indicating a variation of the dark current equivalent component by the operation temperature variation including the first dark current equivalent component $V_{d1}$ determined in such a manner as described above from the output electric signal $V_{D2}$ from the infrared detector 10 at the second operation temperature $T_{D2}$ thereby to convert the output electric signal $V_{D2}$ into the output electric signal $V_{D1}$ from the infrared detector 10 at the first operation temperature $T_{D1}$.

In this manner, a variation of an electric signal outputted from the infrared detector 10 by the operation temperature variation can be compensated for in response to the actual input-output characteristic of the infrared detector 10 and, even if the operation temperature varies, an electric signal corresponding to the temperature (intensity) of an infrared ray having an unknown temperature (unknown intensity) can be obtained with high accuracy. Further, since the first electric signal and the second electric signal used for determining the dark current equivalent component and outputted from the infrared detector 10 when infrared rays having intensities corresponding to blackbodies of the first known temperature and the second known temperature are inputted at the first operation temperature are acquired when correction such as, for example, linear interpolation is performed, the electric signals can be utilized. In this case, by determining the dark current equivalent component at the operation temperature upon performance of correction, the first dark current equivalent component $V_{d1}$ at the first operation temperature $T_{D1}$ is determined, and the value [for example, the variation amount $V_{d2}-V_{d1}$, $V_{d1}(V_{d2}/V_{d1}-1)$ or $V_{d1}(\Delta V_d-1)$] indicative of a variation of the dark current equivalent component by the operation temperature variation including the first dark current equivalent component $V_{d1}$ is determined from logical estimation or actual measurement. Then, a result of the determination is subtracted from the electric signal $V_{D2}$ outputted from the infrared detector 10 at the second operation temperature $T_{D2}$ after the operation temperature variation thereby to convert the output electric signal $V_{D2}$ into the output electric signal $V_{D1}$ from the infrared detector 10 at the first operation temperature $T_{D1}$. In this manner, the output electric signal $V_{D1}$ from the infrared detector 10 at the first operation temperature $T_{D1}$ can be estimated, namely, the variation of the electric signal outputted from the infrared detector 10 by the operation temperature variation can be compensated for. Further, for example, a dummy detector to which an infrared ray is blocked may not be used. Therefore, complication of an apparatus can be suppressed.

Now, derivation of the function f(T) given hereinabove is described.

The sensitivity R of an infrared detector is defined as "ratio of a current value I obtained as an output with respect to a unit input light intensity (power)". Here, an output current dI with respect to input light of an input light intensity $W(\lambda)d\lambda$ between wavelengths $\lambda$ and $\lambda+d\lambda$ can be written, from the definition of the responsivity, where the wavelength dispersion (spectral characteristic) of the sensitivity is represented as $R(\lambda)$, as:

$$dI = R(\lambda)W(\lambda)d\lambda$$

Accordingly, the output current I with respect to the overall spectral characteristic of W is determined by an expression given below by integration of the expression given just above with a wavelength band $[\lambda_1, \lambda_2]$ that is sufficiently greater than an optical system transmission wavelength band.

$$I = \int_{\lambda_1}^{\lambda_2} R(\lambda)W(\lambda)d\lambda$$

Here, $R(\lambda)$ can be written in a form given below from a peak value $R_p(V_{Ig})$ that varies in response to an detector driving bias voltage $(V_{Ig})$ and a standardized spectral response characteristic $R_0(\lambda)$ that does not vary (in the case where it is assumed that it does not vary) in response to $V_{Ig}$.

$$R(\lambda) = R_p(V_{Ig})R_0(\lambda)$$

Further, where $W(\lambda)$ is determined as a wavelength dispersion characteristic $W(\lambda, T)$ of a blackbody radiation intensity at the temperature T, namely, is $$W(\lambda, T) = \frac{2\pi h_c^2}{\lambda^5 \left(e^{\frac{hc}{\lambda k_B T}} - 1\right)}$$

where ($k_B$: Boltzmann's constant, h: Planck's constant, c: speed of light within vacuum), the output current I can be determined, where a proportionality factor that is determined by attenuation and scattering in an optical path or by an aperture diameter is represented as A (it is assumed that the proportionality factor does not depend on the wavelength), by:

$$I = \int_{\lambda_1}^{\lambda_2} R(\lambda) W(\lambda) d\lambda =$$

$$\int_{\lambda_1}^{\lambda_2} R_p(V_{Ig}) R_0(\lambda) \cdot A \cdot W(\lambda, T) d\lambda = A R_p(V_{Ig}) \int_{\lambda_1}^{\lambda_2} R_0(\lambda) W(\lambda, T) d\lambda$$

Accordingly, where current of a fixed value flowing with respect to the dark current, namely, to all input light intensities, is represented as $I_d(V_{Ig})$, the total current $I_{DC}(V_{Ig})$ flowing to the infrared detector by radiation from a blackbody of the temperature $T_1$ is represented by:

$$I_{DC}(V_{Ig}) = A R_p(V_{Ig}) \int_{\lambda_1}^{\lambda_2} R_0(\lambda) W(\lambda, T_1) d\lambda + I_d(V_{Ig})$$

On the other hand, the difference between the total current flowing from a blackbody of the temperature $T_1$ to the infrared detector by radiation and the total current flowing from a blackbody of the temperature $T_2 = T_1 + \Delta T$ to the infrared detector by radiation is represented, where this is represented as $\Delta I_P(V_{Ig})$, by:

$$\Delta I_P(V_{Ig}) = A R_p(V_{Ig}) \int_{\lambda_1}^{\lambda_2} R_0(\lambda) W(\lambda, T_2) d\lambda +$$

$$I_d(V_{Ig}) - A R_p(V_{Ig}) \int_{\lambda_1}^{\lambda_2} R_0(\lambda) W(\lambda, T) d\lambda - I_d(V_{Ig}) =$$

$$A R_p(V_{Ig}) \int_{\lambda_1}^{\lambda_2} R_0(\lambda) W(\lambda, T_2) d\lambda - A R_p(V_{Ig}) \int_{\lambda_1}^{\lambda_2} R_0(\lambda) W(\lambda, T) d\lambda =$$

$$A R_p(V_{Ig}) \int_{\lambda_1}^{\lambda_2} R_0(\lambda) \{ W(\lambda, T_2) - W(\lambda, T) \} d\lambda$$

Here, if it is assumed that $\Delta T$ is sufficiently small, then the inside of the parentheses $\{\cdot\}$ can be approximated to:

$$W(\lambda, T_2) - W(\lambda, T) \approx \left\{ W(\lambda, T) + \frac{\partial W}{\partial T} \Delta T \right\} - W(\lambda, T) = \frac{\partial W}{\partial T} \Delta T$$

Therefore, the difference $\Delta I_P$ can be represented as:

$$\Delta I_P(V_{Ig}) = A R_p(V_{Ig}) \int_{\lambda_1}^{\lambda_2} R_0(\lambda) \{ W(\lambda, T_2) - W(\lambda, T) \} d\lambda \approx$$

$$A R_p(V_{Ig}) \int_{\lambda_1}^{\lambda_2} R_0(\lambda) \frac{\partial W}{\partial T} \Delta T \, d\lambda$$

Here, the ratio of $\Delta I_P(V_{Ig})$ and $I_{DC}(V_{Ig})$, namely, $$\frac{\Delta I_P(V_{Ig})}{I_{DC}(V_{Ig})} = \frac{A R_p(V_{Ig}) \int_{\lambda_1}^{\lambda_2} R_0(\lambda) \{ W(\lambda, T_2) - W(\lambda, T) \} \Delta T \, d\lambda}{A R_p(V_{Ig}) \int_{\lambda_1}^{\lambda_2} R_0(\lambda) W(\lambda, T) d\lambda + I_d(V_{Ig})}$$

is considered. From the result till here, the ratio is given as $$\frac{\Delta I_P(V_{Ig})}{I_{DC}(V_{Ig})} = \frac{A R_p(V_{Ig}) \int_{\lambda_1}^{\lambda_2} R_0(\lambda) \{ W(\lambda, T_2) - W(\lambda, T) \} d\lambda}{A R_p(V_{Ig}) \int_{\lambda_1}^{\lambda_2} R_0(\lambda) W(\lambda, T) d\lambda + I_d(V_{Ig})} \approx$$

$$\frac{A R_p(V_{Ig}) \int_{\lambda_1}^{\lambda_2} R_0(\lambda) \Delta T d\lambda}{A R_p(V_{Ig}) \int_{\lambda_1}^{\lambda_2} R_0(\lambda) W(\lambda, T) d\lambda + I_d(V_{Ig})}$$

Here, the following expression is satisfied:

$$\frac{A R_p(V_{Ig}) \int_{\lambda_1}^{\lambda_2} R_0(\lambda) \frac{\partial W}{\partial T} \Delta T d\lambda}{A R_p(V_{Ig}) \int_{\lambda_1}^{\lambda_2} R_0(\lambda) W(\lambda, T) d\lambda + I_d(V_{Ig})} =$$

$$\frac{\int_{\lambda_1}^{\lambda_2} R_0(\lambda) \frac{\partial W}{\partial T} \Delta T d\lambda}{\int_{\lambda_1}^{\lambda_2} R_0(\lambda) W(\lambda, T) d\lambda} \cdot \frac{A R_p(V_{Ig}) \int_{\lambda_1}^{\lambda_2} R_0(\lambda) W(\lambda, T) d\lambda}{A R_p(V_{Ig}) \int_{\lambda_1}^{\lambda_2} R_0(\lambda) W(\lambda, T) d\lambda + I_d(V_{Ig})}$$

Further, from within the expression given just above, $$\frac{\int_{\lambda_1}^{\lambda_2} R_0(\lambda) \frac{\partial W}{\partial T} d\lambda}{\int_{\lambda_1}^{\lambda_2} R_0(\lambda) W(\lambda, T) d\lambda}$$

is a function of the temperature T that does not rely on a bias condition from the definition or the assumption, and if this is placed as given just below:

$$\frac{\int_{\lambda_1}^{\lambda_2} R_0(\lambda) \frac{\partial W}{\partial T} d\lambda}{\int_{\lambda_1}^{\lambda_2} R_0(\lambda) W(\lambda, T) d\lambda} = \left( \frac{\partial W}{\partial T} \right)_\lambda$$

then such an expression as given just below is obtained:

$$\frac{\Delta I_P(V_{Ig})}{I_{DC}(V_{Ig})} \approx \left( \frac{\partial W}{\partial T} \right)_\lambda \cdot \frac{A R_p(V_{Ig}) \int_{\lambda_1}^{\lambda_2} R_0(\lambda) W(\lambda, T) \Delta T d\lambda}{A R_p(V_{Ig}) \int_{\lambda_1}^{\lambda_2} R_0(\lambda) W(\lambda, T) d\lambda + I_d(V_{Ig})} =$$

$$\left( \frac{\partial W}{\partial T} \right)_\lambda \left[ \frac{A R_p(V_{Ig}) \int_{\lambda_1}^{\lambda_2} R_0(\lambda) W(\lambda, T) d\lambda + I_d(V_{Ig}) - I_d(V_{Ig})}{A R_p(V_{Ig}) \int_{\lambda_1}^{\lambda_2} R_0(\lambda) W(\lambda, T) d\lambda + I_d(V_{Ig})} \right] \Delta T =$$

-continued $$\left(\frac{\partial W}{\partial T}\right)_\lambda \left[1 - \frac{I_d(V_{lg})}{AR_p(V_{lg})\int_{\lambda_1}^{\lambda_2} R_0(\lambda)W(\lambda,T)d\lambda + I_d(V_{lg})}\right]\Delta T =$$

$$\left(\frac{\partial W}{\partial T}\right)_\lambda \left[1 - \frac{I_d(V_{lg})}{I_{DC}(V_{lg})}\right]\Delta T$$

Accordingly, such a relationship as given just below is obtained.

$$\Delta I_p(V_{lg}) \approx \left(\frac{\partial W}{\partial T}\right)_\lambda \left[1 - \frac{I_d(V_{lg})}{I_{DC}(V_{lg})}\right]\Delta T I_{DC}(V_{lg}) =$$

$$\left(\frac{\partial W}{\partial T}\right)_\lambda [I_{DC}(V_{lg}) - I_d(V_{lg})]\Delta T$$

Incidentally, it is assumed that a readout circuit (Read Out Integrated Circuit: ROIC) of the infrared detection apparatus 1 (for example, an FPA) is a popular circuit, namely, a direct injection type circuit. In this case, the potential difference V across a capacitor 11 provided in the ROIC varies depending upon current (detector current) I flowing to the infrared detector 10 (refer to FIG. 8). A well-known expression of Q=CV exists among the capacity value C, accumulated charge Q and inter-terminal voltage V of the capacitor 11, and satisfies the following expression:

$$I = \frac{\Delta Q}{\Delta t} = C\frac{\Delta V}{\Delta t}$$

Here, where an output signal S is defined as an output potential difference per a unit temperature difference in an accumulation time period $\Delta t$, such an expression as given just below is satisfied:

$$\Delta I_p(V_{lg}) \approx \left(\frac{\partial W}{\partial T}\right)_\lambda [I_{DC}(V_{lg}) - I_d(V_{lg})]\Delta T =$$

$$C\frac{S\Delta T}{\Delta t} = C\Delta T \frac{S}{\Delta t} \rightarrow S = \frac{\Delta I_p(V_{lg})}{\Delta T}\frac{\Delta t}{C}$$

Therefore, if a result of the calculation given above is used, then such a relationship as given below is obtained:

$$S = \frac{\Delta I_p(V_{lg})}{\Delta T}\frac{\Delta t}{C}$$

$$= \left(\frac{\partial W}{\partial T}\right)_\lambda [I_{DC}(V_{lg}) - I_d(V_{lg})]\frac{\Delta T}{C}$$

$$= \left(\frac{\partial W}{\partial T}\right)_\lambda [I_{DC}(V_{lg}) - I_d(V_{lg})]$$

$$= \left(\frac{\partial W}{\partial T}\right)_\lambda V_{DC}(V_{lg})\left[1 - \frac{V_d(V_{lg})}{V_{DC}(V_{lg})}\right]$$

Incidentally, the output signal S is represented, from the definition of "output potential difference per a unit temperature difference in an accumulation time period $\Delta t$", as:

$$S = \frac{dV_{DC}(T, V_{lg})}{dT}$$

Therefore, such a differential equation as given below relating to $V_{DC}(T, V_{lg})$ is obtained:

$$\frac{dV_{DC}(T, V_{lg})}{dT} = \left(\frac{\partial W}{\partial T}\right)_\lambda V_{DC}(T, V_{lg})\left[1 - \frac{V_d(V_{lg})}{V_{DC}(T, V_{lg})}\right]$$

Since, in the operation state of the infrared detector 10 examined here, the bias voltage $V_{Ig}$ is fixed, the representation of $V_{Ig}$ is omitted. Further, $V_{DC}=V_P+V_d$. Therefore, the expression given above is finally represented as:

$$\frac{dV_P(T)}{dT} = \left(\frac{\partial W}{\partial T}\right)_\lambda V_P(T)$$

Accordingly, the following expression is obtained.

$$f(T) = \left(\frac{\partial W}{\partial T}\right)_\lambda = \frac{\int_{\lambda_1}^{\lambda_2} R_0(\lambda)\frac{\partial W}{\partial T}d\lambda}{\int_{\lambda_1}^{\lambda_2} R_0(\lambda)W(\lambda,T)d\lambda}$$

The function f(T) by which the shape is to be determined can be derived in such a manner as described above.

Now, derivation of an approximation expression of the function f(T) given above is described.

If it is assumed that a target object is a blackbody, then the wavelength dispersion characteristic $W(\lambda, T)$ of the blackbody radiation intensity at the temperature T (so-called Planck's formula of radiation) is given by $$W(\lambda, T) = \frac{2\pi hc^2}{\lambda^5 \left(e^{\frac{hc}{\lambda k_B T}} - 1\right)}$$

Where the following expression is satisfied:

$$\frac{hc}{\lambda k_B T} \gg 1$$

the wavelength dispersion characteristic $W(\lambda, T)$ can be approximated to $$W(\lambda, T) = \frac{2\pi hc^2}{\lambda^5}\exp\left(-\frac{hc}{\lambda k_B T}\right)$$

It is to be noted that, where $\lambda=3$ to 5 μm or $\lambda=8$ to 12 μm that are wavelengths popularly used in the infrared detection apparatus 1, the approximation condition is approximately 600° C., approximately 100° C. or less (it is assumed that the error is 2%). Generally, in the application field of the infrared detection apparatus 1, there are many cases in which an object at or around a room temperature, particularly, in the medical field or the security field, a living organism, is a target. Since most part of the constituent material of a living organism is water, it is considered that the temperature of a target object in the application field of the infrared detection apparatus 1 is approximately 0° C. (freezing point of water) or more but 100° C. (boiling point of water) or less.

Accordingly, it is expected that the approximation condition described above is sufficient for a condition in the common infrared detection apparatus 1.

Since, within a range within which such approximation as given above is satisfied, $$\frac{\partial W}{\partial T} = \frac{d}{dT}\left\{\frac{2\pi h_c^2}{\lambda^5}\exp\left(-\frac{hc}{\lambda k_B T}\right)\right\} = \frac{2\pi h_c^2}{\lambda^5}\frac{hc}{\lambda k_B T^2}\exp\left(-\frac{hc}{\lambda k_B T}\right) = \frac{hc}{\lambda k_B T^2}W(\lambda, T)$$

is satisfied, such an expression as given just below is satisfied:

$$\left(\frac{\partial W}{\partial T}\right)_\lambda = \frac{\int_{\lambda_1}^{\lambda_2} R_0(\lambda)\frac{\partial W}{\partial T}d\lambda}{\int_{\lambda_1}^{\lambda_2} R_0(\lambda)W(\lambda, T)d\lambda} = \frac{hc}{k_B T^2}\frac{\int_{\lambda_1}^{\lambda_2}\frac{1}{\lambda}R_0(\lambda)W(\lambda, T)d\lambda}{\int_{\lambda_1}^{\lambda_2} R_0(\lambda)W(\lambda, T)d\lambda}$$

Here, definite integration, namely, $$\int_{\lambda_1}^{\lambda_2} \frac{1}{\lambda}R_0(\lambda)W(\lambda, T)d\lambda$$

is approximated as given below using a suitable real constant x:

$$\int_{\lambda_1}^{\lambda_2} \frac{1}{\lambda}R_0(\lambda)W(\lambda, T)d\lambda = \frac{1}{x\lambda_p}\int_{\lambda_1}^{\lambda_2} R_0(\lambda)W(\lambda, T)d\lambda$$

In this case, the following expression is satisfied:

$$\left(\frac{\partial W}{\partial T}\right)_\lambda = \frac{hc}{k_B T^2}\frac{\int_{\lambda_1}^{\lambda_2}\frac{1}{\lambda}R_0(\lambda)W(\lambda, T)d\lambda}{\int_{\lambda_1}^{\lambda_2} R_0(\lambda)W(\lambda, T)d\lambda} =$$

$$\frac{hc}{x\lambda_p k_B T^2}\frac{\int_{\lambda_1}^{\lambda_2} R_0(\lambda)W(\lambda, T)d\lambda}{\int_{\lambda_1}^{\lambda_2} R_0(\lambda)W(\lambda, T)d\lambda} = \frac{hc}{x\lambda_p k_B T^2}$$

The approximation expression to the function f(T) described above can be derived in such a manner as given above. In particular, such an approximation expression as given above can be derived as a particular function form of an analytic form using two kinds of approximation including "the temperature of an object of an imaging target is proximate to a room temperature" and "the factor of 1/λ can be placed to the outside of integration effectively as a constant factor of $1/x\lambda_P$".

Incidentally, while, as the function f(T) in the expression of $$\frac{dV_p}{dT} = f(T)V_p \Leftrightarrow V_p = V_0\exp\left\{\int f(T)dT\right\}$$

the expression approximated using the real constant x, namely, $$f(T) = \frac{hc}{x\lambda_p k_B T^2}$$

is used as described hereinabove, the function f(T) is not limited to this.

For example, $R_0(\lambda)$ obtained as a result of actual measurement (particularly, a function representing this) may be substituted into $R_0(\lambda)$ in an expression given below and integration may be executed analytically to determine an analytical function form of particular f(T) and then the function form may be used as the function f(T) in the expression given above.

$$f(T) = \left(\frac{\partial W}{\partial T}\right)_\lambda = \frac{\int_{\lambda_1}^{\lambda_2} R_0(\lambda)\frac{\partial W}{\partial T}d\lambda}{\int_{\lambda_1}^{\lambda_2} R_0(\lambda)W(\lambda, T)d\lambda}$$

In particular, if, in place to assume Gaussian for $R_0(\lambda)$ and perform approximation as described above to determine an analytic function form of particular f(T), a particular function form of f(T) can be determined by assuming, for $R_0(\lambda)$, not Gaussian but, for example, Laurentian, namely, such an expression as given below:

$$R_0(\lambda) = \frac{1}{1 + w(\lambda - \lambda_p)^2}$$

and executing such integration as $$\int_{\lambda_1}^{\lambda_2} R_0(\lambda)\frac{\partial W}{\partial T}d\lambda, \int_{\lambda_1}^{\lambda_2} R_0(\lambda)W(\lambda, T)d\lambda$$

without approximation, then also it is possible to use the particular function form as the function f(T) in the expression given above.

However, it is desirable to be able to analytically execute integration given by:

$$\int f(T)dT$$

In this manner, as the relational expression that includes, at the portion thereof relating to the dependency of the infrared intensity on the temperature, not a constant but a function of the temperature, an expression given below can be used:

$$f(T) = \frac{\int_{\lambda_1}^{\lambda_2} R_0(\lambda)\frac{\partial W}{\partial T}d\lambda}{\int_{\lambda_1}^{\lambda_2} R_0(\lambda)W(\lambda, T)d\lambda}$$

In particular, where the relational expression that includes, at the portion thereof relating to the dependency of the infrared intensity on the temperature, not a constant but a function of the temperature is represented as:

$$\frac{dV_p}{dT} = f(T)V_p$$

the function f(T) in the expression may be represented as:

$$f(T) = \frac{\int_{\lambda_1}^{\lambda_2} R_0(\lambda)\frac{\partial W}{\partial T}d\lambda}{\int_{\lambda_1}^{\lambda_2} R_0(\lambda)W(\lambda, T)d\lambda}$$

In the following, the present embodiment is described taking, as an example, a case where the present technology is applied in order to compensate for a variation, caused by an operation temperature variation, of an output electric signal (pixel signal) from each infrared detector 10 (pixel) in the FPA type infrared detection apparatus 1 that is the infrared detection apparatus 1 including a plurality of infrared detectors 10 and in which the plurality of infrared detectors 10 are arrayed two-dimensionally.

Here, the infrared detection apparatus 1 converts an intensity distribution of an infrared ray projected to the infrared detectors 10 provided in the infrared detection apparatus 1 with respect to an infrared ray radiated by thermal radiation of an object into an electric signal distribution to obtain an infrared image. For example, in the FPA type infrared detection apparatus 1, the infrared detectors 10 corresponding to pixels are disposed two-dimensionally on a plane and an intensity distribution of an infrared ray projected in the plane is converted into an electric signal distribution thereby to obtain an infrared image.

Since such an infrared detection apparatus 1 as described above can take, different from an imaging apparatus in the visible radiation region, an image of a target object also in the darkness, the infrared detection apparatus 1 is utilized for a field of application such as the field of security. Further, since the intensity of an infrared ray radiated from a target object is represented by a function of the temperature of the target object, an image on which a temperature distribution of the object is reflected is obtained from an infrared ray radiation intensity distribution of an imaging object. It is expected that the infrared detection apparatus 1 is practically used in the medical field or the like utilizing this.

However, it is difficult to produce a plurality of infrared detectors having a same input-output characteristic. In particular, it is difficult to produce a plurality of infrared detectors from which a same electric signal is outputted where an infrared ray having an equal intensity is inputted. For example, it is difficult to set the input-output characteristic of a plurality of infrared detectors provided in the FPA type infrared detection apparatus to same as each other. Therefore, if the infrared detectors are different from each other, then electric signals different from each other are outputted although an infrared ray having an equal intensity is inputted. For example, in the FPA type infrared detection apparatus, a distribution appears in electric signals outputted from a plurality of infrared detectors although an infrared ray whose intensity is uniform in a plane is inputted. In this manner, it is difficult to produce the characteristics so as to be uniform among infrared detectors, and accordingly, a distribution appears in output signals even if an in-plane distribution of the intensity of a projected infrared ray is uniform.

Therefore, an electric signal outputted from the infrared detector is corrected by the signal processor provided in the infrared detection apparatus such that, even if the infrared detectors are different from each other, same electric signals can be obtained if an infrared ray having an equal intensity is inputted. For example, in the FPA type infrared detection apparatus 1, electric signals outputted from the infrared detectors are corrected by the signal processor such that, when an infrared ray whose intensity is uniform in a plane is inputted, the electric signals outputted from the infrared detectors are uniformized.

In this case, several infrared rays having known intensities are inputted uniformly in a plane to measure the outputs of the infrared rays, and a pixel output corresponding to an input light intensity other than the known intensities is corrected by interpolation based on a result of the measurement. Where such correction as just described is performed, since it is demanded to provide a number of infrared sources of known intensities equal to the number of correction points in an apparatus or the like, the apparatus becomes complicated. Therefore, interpolation at two points where the number of correction points is smallest in principle is performed normally. In this case, normally a linear interpolation method is used assuming linearity of the infrared detector 10 (pixel; pixel element) between two points. In particular, for example, using two infrared sources, infrared rays having known intensities are inputted to the infrared detectors and electric signals outputted from the infrared detectors at this time are acquired. Then, assuming that the input-output characteristic of the infrared detectors is linear between the two points, linear interpolation is applied to correct an electric signal outputted from each infrared detector when an infrared ray from a target object is inputted to the infrared detector.

However, if the operation temperature is varied, for example, by some disturbance, then principally dark current of the infrared detector varies and an electric signal outputted from the infrared detector varies.

For example, also in the case where such correction as described above is performed, correction is performed for an electric signal outputted from the infrared detector after operation temperature variation using the input-output characteristic (correction information) of the infrared detector determined based on an electric signal outputted from the infrared detector before the operation temperature variation. Therefore, it is difficult to perform correction with high accuracy. Further, although such correction as described above is performed, a same electric signal is not obtained when an infrared ray having an equal intensity is inputted, and a variability (variation; shift) in electric signals outputted from the infrared detectors appears again in such a form that a variability (variation; shift) in characteristics of the infrared detectors is reflected. As a result, quality of an obtained image degrades. Further, a variation of an output electric signal by an operation temperature variation (principally, a variation of the dark current equivalent component) causes a variation of an average value of electric signals outputted from the infrared detectors. Therefore, for example, if the magnitude of an electric signal outputted from the infrared detector is associated with contrast in monochrome of an image, then the overall color tone of an image varies. For example, the color tone of an image varies to white or black generally.

Further, where compensation is performed using a dummy detector to which an infrared ray is blocked, since it is difficult to fully block the infrared ray, it is difficult to achieve compensation with high accuracy. For example, in the infrared detection apparatus, an infrared ray that is a target of image is radiated from all objects existing therearound in a form corresponding to the temperature, and it is difficult to fully block an infrared ray at least in a state in which the infrared detection apparatus is incorporated actually as an apparatus. Further, for example, it is difficult to estimate the dark current equivalent component of each of the plurality of infrared detectors, and it is difficult to perform compensation with high accuracy in accordance with the characteristic variability of the plurality of infrared detectors. Further, for example, although it may seem a recommendable idea to incorporate a dummy detector in each of the plurality of infrared detectors, this complicates an detector structure.

Therefore, in order to make it possible to compensate for an electric signal outputted from the infrared detector 10 with high accuracy even if the operation temperature varies, a variation arising from an operation temperature variation of an output electric signal from each of the infrared detectors 10 in the FPA type infrared detection apparatus 1 is compensated for by applying the technique described above. In this case, the dark current equivalent component of the output electric signal from each of the infrared detectors 10 can be determined directly and individually, and a variation of an output electric signal arising from an operation temperature variation can be compensated for.

Here, as depicted in FIG. 1, the FPA type infrared detection apparatus as the infrared detection apparatus 1 includes an infrared image sensor 2 and a signal processor 4 that processes electric signals outputted from the infrared detectors 10 (pixels) provided in the infrared image sensor 2.

Figure 5:
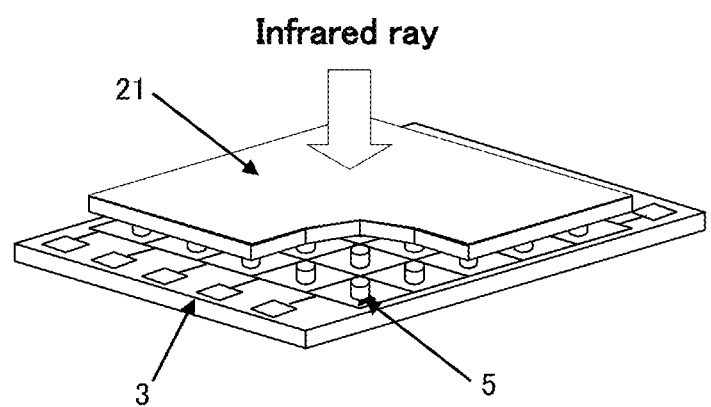
FIG. 5 is a view depicting a configuration of an infrared image sensor provided in the FPA type infrared imaging apparatus that is the example of the infrared detection apparatus according to the embodiment.

As depicted in FIG. 5, the infrared image sensor 2 includes a two-dimensional array (infrared detector array) 21 in which a plurality of infrared detectors 10 are arrayed two-dimensionally and a readout circuit chip 3 including a readout circuit that successively reads out output voltages corresponding to current amounts flowing to the infrared detectors (pixels) 10 when an infrared ray is inputted. It is to be noted that the readout circuit is referred to sometimes as ROIC (readout integrated circuit). The two-dimensional array 21 and the readout circuit chip 3 are coupled (hybrid coupled) to each other and integrated with each other through conductive metal bumps (conductive bumps; here, In bumps) 5. Here, each of the infrared detectors is, for example, a quantum well type infrared detector or a quantum dot type infrared detector, whose resistance value and dark current vary in response to an operation temperature variation.

Figure 4:
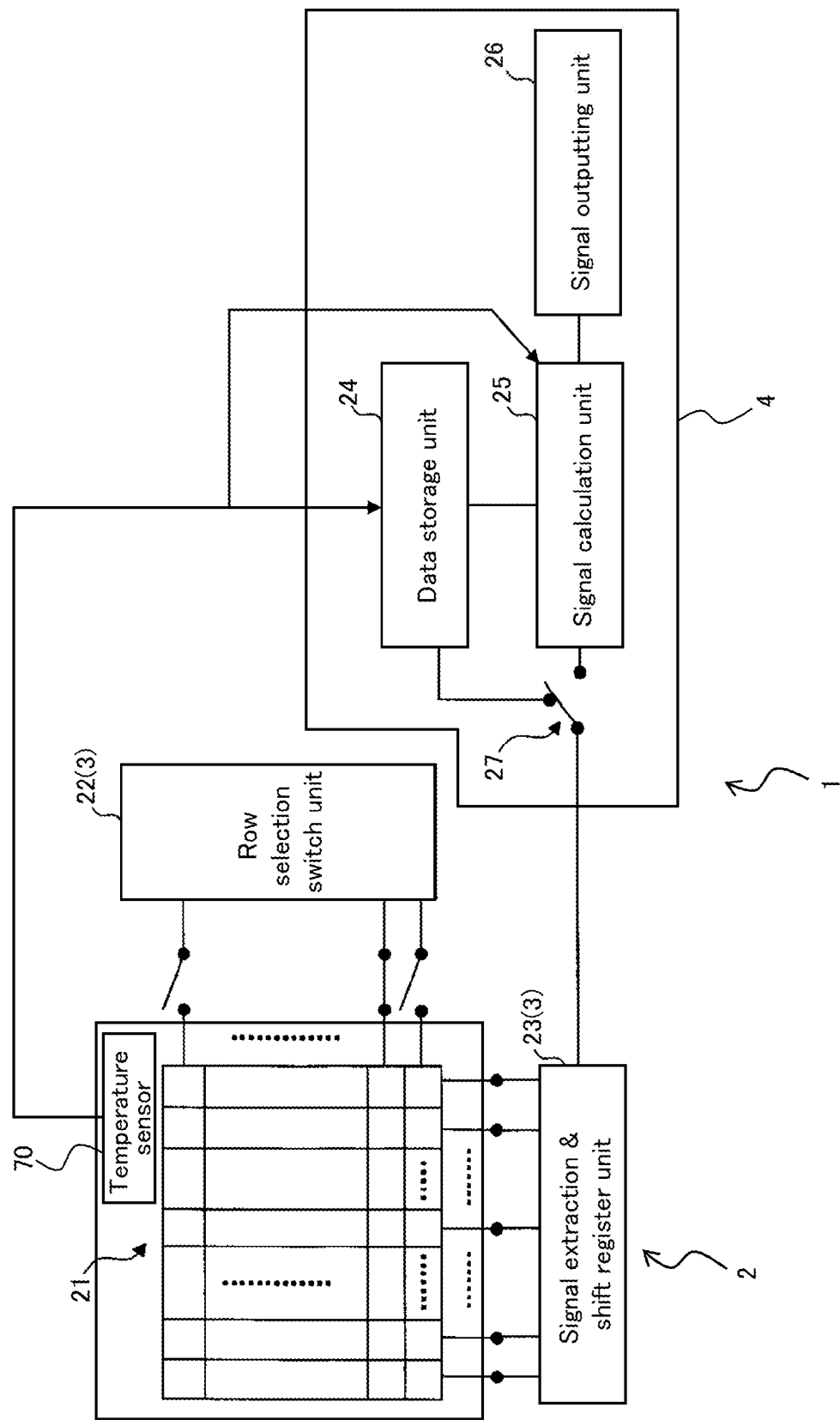
FIG. 4 is a view depicting a configuration of an FPA type infrared imaging apparatus that is an example of an infrared detection apparatus according to the embodiment.

Here, as depicted in FIG. 4, the readout circuit chip 3 includes a row selection switch unit 22 and a signal extraction & shift register unit 23. It is to be noted that a signal extraction unit included in the signal extraction & shift register unit 23 is provided for each of the infrared detectors 10. An electric signal outputted from each of the infrared detectors 10 can be extracted individually using the row selection switch unit 22 and the signal extraction & shift register unit 23. In particular, pixels at a designated row position are selected by the row selection switch unit 22 and, by the signal extraction & shift register unit 23, a pixel at a designated column position can be selected. Consequently, from the pixel 10 at the designated row position and column position, image data of the pixel 10 is read out as an output voltage.

Further, the two-dimensional array 21 includes a temperature sensor 70 for detecting an operation temperature of the two-dimensional array 21 or an infrared detector 10. The temperature sensor 70 is provided in the proximity of the two-dimensional array 21 or the infrared detector 10, and detects (measures) an operation temperature of the two-dimensional array 21 or the infrared detector 10. Therefore, the operation temperature of the entire two-dimensional array 21, namely, an average operation temperature of the plurality of infrared detectors 10, is detected by the temperature sensor 70. Further, an output signal from the temperature sensor 70 is sent to the signal processor 4. It is to be noted that the temperature sensor 70 is hereinafter referred to sometimes as array temperature sensor.

It is to be noted that the temperature sensor 70 may be provided otherwise for each of the infrared detectors or for each of a suitable number of infrared detectors such that an operation temperature is detected for each of the infrared detectors or for each of the suitable number of infrared detectors. Further, as the temperature sensor 70, an device (element) capable of detecting the temperature may be provided, and, for example, a resistor may be provided for each infrared detector such that the temperature is estimated from a current voltage characteristic of the resistor. Therefore, the temperature sensor 70 is hereinafter referred to sometimes as temperature detection unit.

The signal processor 4 further includes a data storage unit 24, a signal calculation unit 25, a signal outputting unit 26 and a switch 27.

In this manner, the FPA type infrared detection apparatus 1 includes the two-dimensional array 21, row selection switch unit 22, signal extraction & shift register unit 23, data storage unit 24, signal calculation unit 25, signal outputting unit 26 and switch 27.

It is to be noted that, as depicted in FIG. 4, the boundary between each functional block and a different functional block indicated by boxes basically indicates a functional boundary, and the boundary does not necessarily correspond to physical separation in position, electrical separation in signal, control-logical separation or the like. Each functional blocks may be one hardware module physically separated by some degree from a different block or may indicate one function from within a hardware module physically integrated with a different block.

Figure 6:
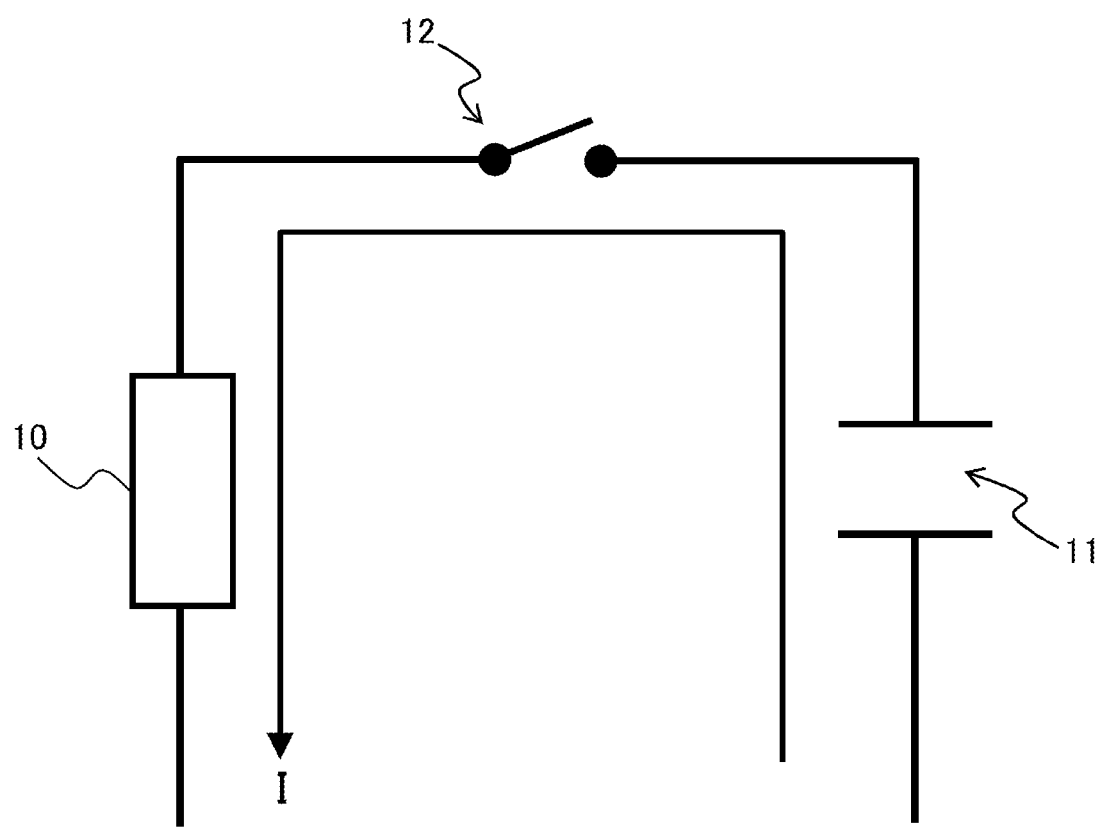
FIG. 6 is a view illustrating readout of a signal from an infrared detector provided in the infrared image sensor of the FPA type infrared imaging apparatus that is the example of the infrared detection apparatus according to the embodiment.

Incidentally, here, as depicted in FIG. 6, the signal extraction unit included in the signal extraction & shift register unit 23 includes a capacitor 11 (capacitive element) and a transistor that operates as a switch 12, and is coupled with the infrared detector 10. The infrared detector 10 has a characteristic that the electric resistance value thereof varies in response to the amount of an input infrared ray and generates an output electric amount in response to the inputted infrared ray (for example, current flows). The current of an amount corresponding to the resistance value of the infrared detector 10 flows from the capacitor 11 to the ground GND side through the switch 12 and the infrared detector 10, and the charge of the capacitor 11 is reduced. A voltage corresponding to the potential difference across the capacitor 11 which potential difference varies in response to the reduction of the charge is extracted as image data by the signal extraction unit. Further, the shift register unit included in the signal extraction & shift register unit 23 extracts column output signals under a fixed bias voltage in a selected column as a serial signal of a time series. In the serial signal at this time, depending upon a variability of the input-output characteristic of each of the infrared detectors 10, the output voltage intensity varies even if light having an input light amount of an equal intensity is inputted.

As depicted in FIG. 4, the output voltages of the infrared detectors 10 extracted by the signal extraction & shift register unit 23 are supplied to the data storage unit 24 or the signal calculation unit 25 through the switch 27.

Upon activation (or upon performance of correction) of the apparatus, an output voltage from the signal extraction & shift register unit 23 is supplied to the data storage unit 24 in a state in which a radiation infrared ray uniform in a plane from a blackbody having a known temperature is inputted to the two-dimensional array 21. Consequently, data for correction and operation temperature compensation are stored into the data storage unit 24.

Upon imaging a target object, varied serial signals from the signal extraction & shift register unit 23 are supplied to the signal calculation unit 25.

The signal calculation unit 25 executes an arithmetic operation for compensating for a variation of an output electric signal caused by an operation temperature variation for each of the infrared detectors 10 on the basis of the data for operation temperature compensation stored in the data storage unit 24. By the operation temperature compensation arithmetic operation, a post operation temperature compensation output voltage after a variation of the output voltage intensity caused by the operation temperature variation is compensated for is obtained.

Further, the signal calculation unit 25 executes an arithmetic operation for correcting a variability of the output voltage intensity caused by a variability of the input-output characteristic of the infrared detector 10 under a predetermined bias condition for each of the infrared detectors 10 on the basis of the data for correction stored in the data storage unit 24. By the correction arithmetic operation, a post correction output voltage after the variability of the output voltage intensity caused the variability of the input-output characteristic of the infrared detector 10 is corrected can be obtained. At this time, the signal calculation unit 25 calculates a temperature corresponding to an input infrared ray on the basis of the output electric amount of the infrared detector 10. The post correction output voltage is a voltage indicative of the temperature of an imaging target for each of the infrared detectors 10 and is supplied from the signal calculation unit 25 to the signal outputting unit 26.

An operation temperature compensation method and a correction method for an output electric signal from each infrared detector 10 in the infrared detection apparatus 1 depicted in FIG. 4 are described below.

Figure 7:
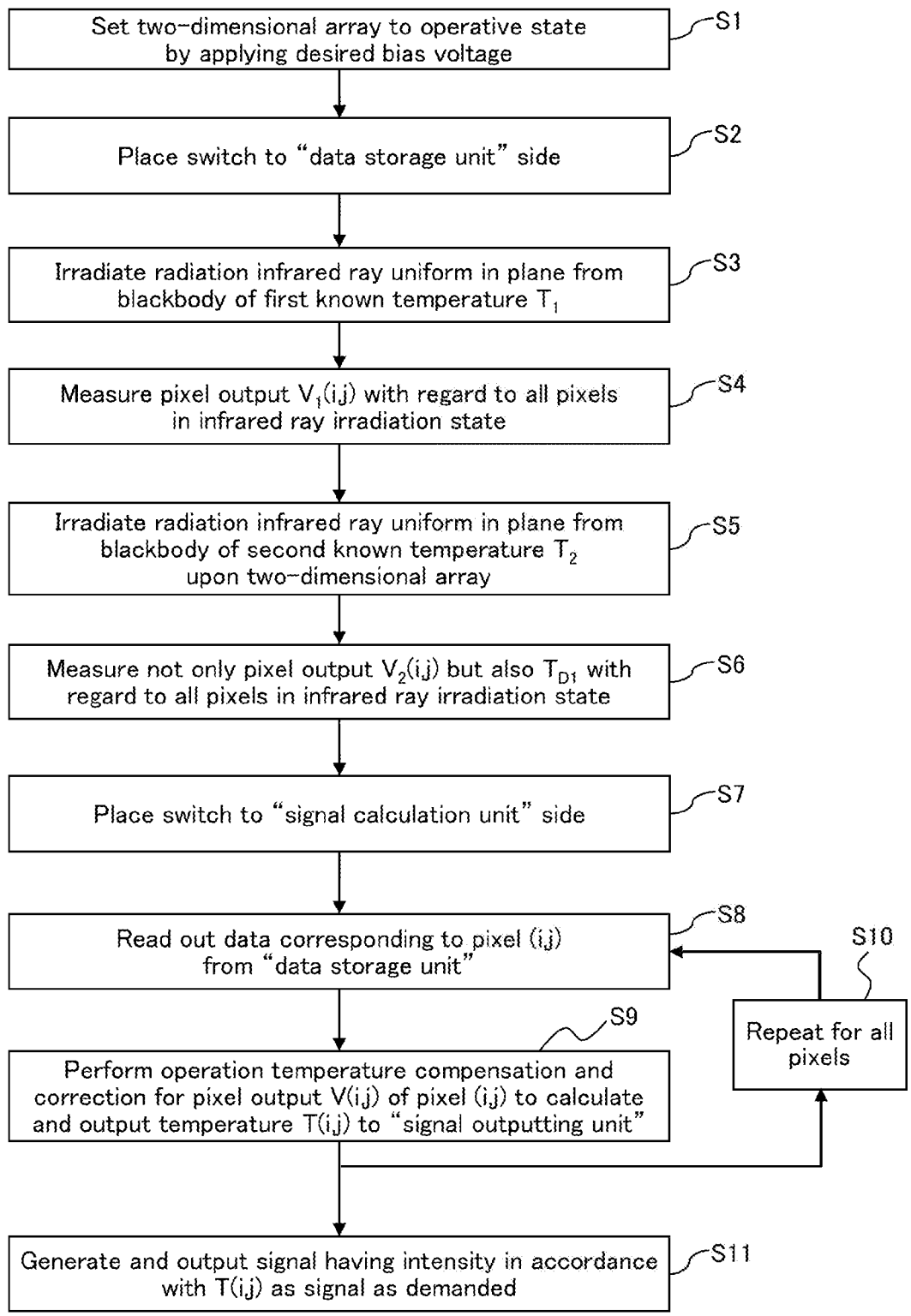
FIG. 7 is a flowchart illustrating a first example of an operation temperature compensation method and a correction method in the FPA type infrared imaging apparatus that is the example of the infrared detection apparatus according to the embodiment.

FIG. 7 is a flowchart illustrating a first example of the operation temperature compensation method and the correction method for an output electric signal from each infrared detector 10 in the infrared detection apparatus 1. The operation temperature compensation method and the correction method depicted in FIG. 7 are described with reference to FIGS. 4 and 7. It is to be noted that the execution order of steps in the flowchart is not limited to the order indicated by the flow chart, and the execution order of the steps may be reshuffled if a trouble does not occur in operation. It is to be noted that the two-dimensional array 21 is formed as a two-dimensional array configured, for example, from n×n pixels.

First as step S1, the two-dimensional array 21 is set to an operation state in which a desired bias voltage is applied. In particular, a state is established in which a fixed bias voltage $V_{Ig}$ is applied to the infrared detectors 10 that configure pixels of the two-dimensional array 21.

At step S2, the switch 27 is coupled with the data storage unit 24 side.

At step S3, an infrared ray radiated from an object (infrared source) equivalent to a blackbody of a temperature $T_1$ (infrared ray having an intensity equivalent to a blackbody of the temperature $T_1$) is inputted (irradiated) uniformly in a plane to (upon) the two-dimensional array 21.

At step S4, the row selection switch unit 22 and the signal extraction & shift register unit 23 are activated in a state in which the infrared ray is inputted to acquire a pixel output voltage value $V_1(i, j)$ from each of the pixels 10 of the two-dimensional array 21. The output voltage values $V_1(i, j)$ are supplied from the signal extraction & shift register unit 23 to the data storage unit 24 and are stored into the data storage unit 24.

Figure 8:
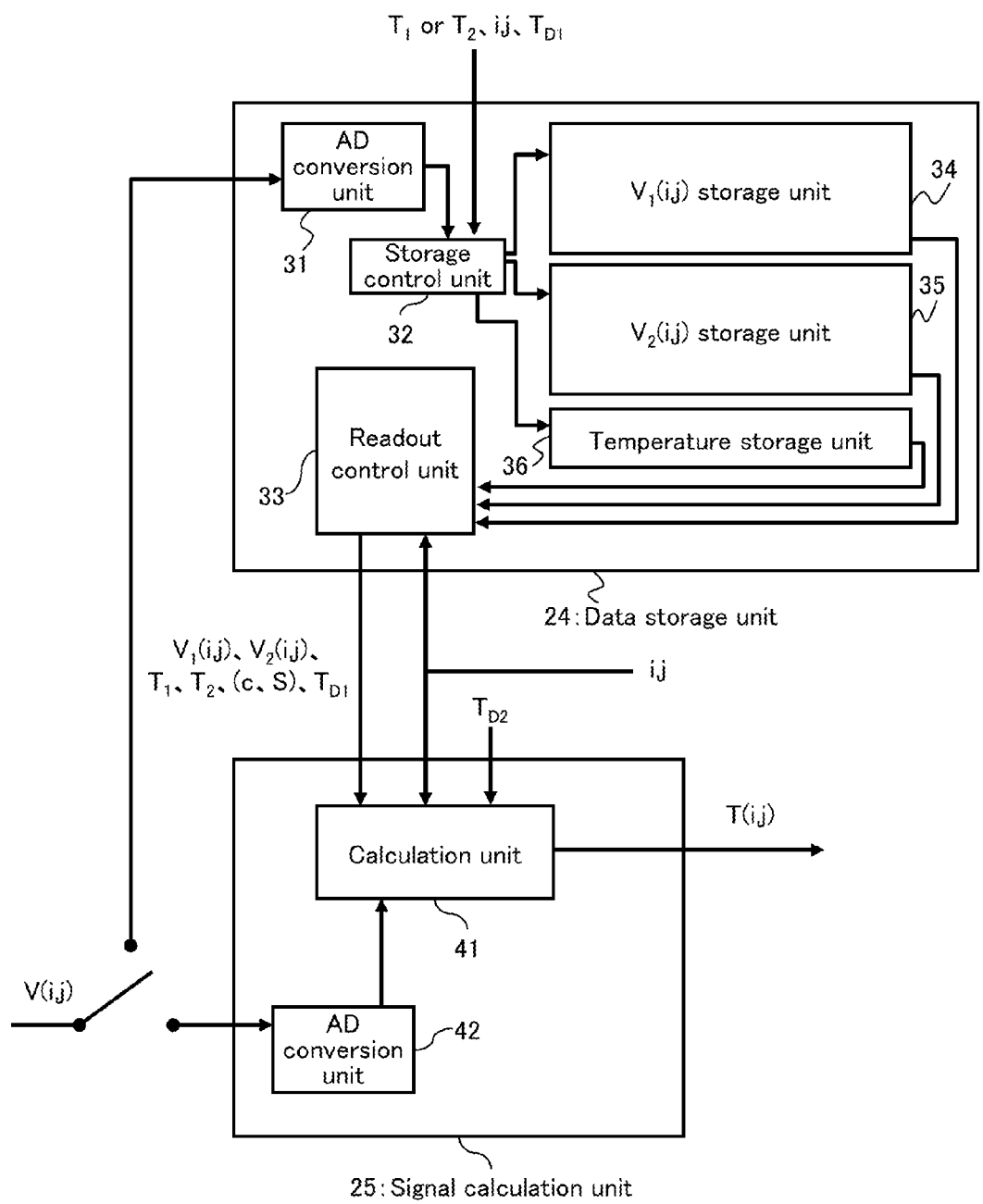
FIG. 8 is a view depicting an example of a configuration of a data storage unit and a signal calculation unit provided in a signal processor of the first example of the operation temperature compensation method and the correction method in the FPA type infrared imaging apparatus that is the example of the infrared detection apparatus according to the embodiment.

FIG. 8 is a view depicting an example of a configuration of the data storage unit 24 and the signal calculation unit 25.

The data storage unit 24 includes an AD conversion unit 31, a storage control unit 32, a readout control unit 33, a $V_1(i, j)$ storage unit 34, a $V_2(i, j)$ storage unit 35 and a temperature storage unit 36. Further, the signal calculation unit 25 includes a calculation unit 41 and an AD conversion unit 42.

The AD conversion unit 31 converts an analog output voltage supplied thereto from the signal extraction & shift register unit 23 into a digital voltage value.

Data indicating a pixel position (i, j) of an output voltage supplied at present and data indicating a temperature $T_1$ or $T_2$ of a source of an infrared ray inputted at present are supplied to the data storage unit 24.

The storage control unit 32 stores the digital voltage value after AD conversion by the AD conversion unit 31 into the $V_1(i, j)$ storage unit 34. At this time, the storage control unit 32 stores the digital voltage value into a memory position corresponding to the pixel position (i, j). Further, the storage control unit 32 stores the temperature $T_1$ of the infrared source at present into the temperature storage unit 36.

Referring back to FIG. 7, at step S5, an infrared ray radiated from the object (infrared source) equivalent to a blackbody of the temperature $T_2$ (an infrared ray having an intensity equivalent to a blackbody of the temperature $T_2$) is inputted (irradiated) uniformly in a plane to (upon) the two-dimensional array 21.

At step S6, the row selection switch unit 22 and the signal extraction & shift register unit 23 are activated in a state in which the infrared ray is inputted to acquire pixel output voltage values $V_2(i, j)$ from the pixels 10 of the two-dimensional array 21. The output voltage values $V_2(i, j)$ are supplied from the signal extraction & shift register unit 23 to the data storage unit 24 and stored into the data storage unit 24.

In the data storage unit 24 depicted in FIG. 8, a digital voltage value obtained by AD-conversion of each output voltage value $V_2(i, j)$ by the AD conversion unit 31 is stored into the $V_2(i, j)$ storage unit 35 by the storage control unit 32. At this time, the storage control unit 32 stores a digital voltage value into a memory position corresponding to the pixel position (i, j). Further, the storage control unit 32 stores the temperature $T_2$ of the infrared source at present into the temperature storage unit 36.

Further, the storage control unit 32 acquires an operation temperature (first operation temperature) $T_{D1}$ of the two-dimensional array 21 at this time point from the temperature sensor 70 and stores the acquired temperature into the temperature storage unit 36.

The acquisition of the data to be used for operation temperature compensation and correction is complemented thereby.

It is to be noted that values of x, $\lambda_P$ or $x\lambda_P$ acquired separately are stored in the data storage unit 24.

Further, the data acquisition process described above may be performed upon activation of the apparatus or upon performance of correction. Especially, when correction is performed, since the data acquisition process described above is performed upon performance of correction, the data acquisition process described above need not be performed separately from this, but data acquired by the data acquisition process described above performed upon performance of correction may be used for the operation temperature compensation. However, the data acquisition process described above may be performed separately from the data acquisition process described above performed upon performance of correction.

Now, an operation for performing operation temperature compensation and correction to obtain an infrared image is executed in a normal use state of the infrared detection apparatus 1.

At step S7 in FIG. 7, the switch 27 is coupled with the signal calculation unit 25 side.

Consequently, in a state in which the fixed bias voltage $V_{Ig}$ is applied to the infrared detectors 10 configuring the pixels, the row selection switch unit 22 and the signal extraction & shift register unit 23 are activated to successively read out pixel outputs V(i, j) from the pixels (i, j) of the two-dimensional array 21 to the signal calculation unit 25. Here, the operation temperature at this point of time (second operation temperature; operation temperature after operation temperature variation) is represented as $T_{D2}$ and the pixel output from each of the pixels (i, j) at the operation temperature $T_{D2}$ is represented as $V_{D2}(i, j)$.

If a pixel output voltage $V_{D2}(i, j)$ from each pixel (i, j) is inputted to the signal calculation unit 25, then, in response to data indicative of the pixel position (i, j), values of data $V_1(i, j)$, $V_2(i, j)$ corresponding to the pixel (i, j) and $T_1$, $T_2$, $T_{D1}$, x, $\lambda_P$ or $x\lambda_P$ are read out from the data storage unit 24 (step S8 of FIG. 7), and the operation temperature (second operation temperature) $T_{D2}$ at this point of time is acquired from the temperature sensor 70.

The AD conversion unit 42 of the signal calculation unit 25 converts the pixel output voltage $V_{D2}(i, j)$ from each pixel (i, j) from an analog voltage into a digital voltage value. The calculation unit 41 of the signal calculation unit 25 performs the operation temperature compensation process for the digital voltage value after the conversion to convert the digital voltage value into the pixel output voltage $V_{D1}(i, j)$ of each pixel (i, j) at the operation temperature $T_{D1}$. It is to be noted that, where the operation temperature $T_{D2}$ is equal to the operation temperature $T_{D1}$, namely, where the operation temperature does not vary, the operation temperature compensation process may not be performed.

Here, the calculation unit 41 of the signal calculation unit 25 calculates a first dark current equivalent component (first dark current equivalent output voltage component) $V_{d1}(i, j)$ of the pixel (i, j) at the first operation temperature $T_{D1}$ using the values of the data $V_1(i, j)$, $V_2(i, j)$ and $T_1$, $T_2$, x, $\lambda_P$ or $x\lambda_P$ corresponding to the pixel (i, j) by the following expression:

$$V_{d1}(i, j) = \frac{V_1(i, j)\exp\left(-\frac{hc}{x\lambda_p k_B T_2}\right) - V_2(i, j)\exp\left(-\frac{hc}{x\lambda_p k_B T_1}\right)}{\exp\left(-\frac{hc}{x\lambda_p k_B T_2}\right) - \exp\left(-\frac{hc}{x\lambda_p k_B T_1}\right)}$$

Further, the calculation unit 41 of the signal calculation unit 25 calculates a variation amount $V_{d2}(i, j) - V_{d1}(i, j)$ that is a value indicating a variation of the dark current equivalent component of each pixel (i, j) caused by an operation temperature variation when the operation temperature varies to the second operation temperature after the operation temperature variation using $V_{d1}(i, j)$, $T_{D1}$, $T_{D2}$ and a function $h(T_D)$ representative of the operation temperature $T_D$ dependency of the dark current equivalent component, where a second dark current equivalent component (second dark current equivalent output voltage component) of the pixel (i, j) at the second operation temperature $T_{D2}$ is represented as $V_{d2}(i, j)$, by:

$$V_{d2}(i, j) - V_{d1}(i, j) = V_{d1}(i, j)\left(\frac{h(T_{D2})}{h(T_{D1})} - 1\right)$$

or by an expression given below obtained by linearization of the expression above in the proximity of the first operation temperature $T_{D1}$.

$$V_{d2}(i, j) - V_{d1}(i, j) = V_{d1}(i, j)\frac{h'(T_{D1})}{h(T_{D1})}(T_{D2} - T_{D1})$$

It is to be noted that, as the function $h(T_D)$ representative of the operation temperature $T_D$ dependency of the dark current equivalent component, the function described above may be used.

The calculation unit 41 of the signal calculation unit 25 subtracts, by the expression given below, a variation amount of the dark current equivalent component of each pixel (i, j) caused by the operation temperature variation calculated in such a manner as described above, namely, the difference $(V_{d2}(i, j) - V_{d1}(i, j))$ between the second dark current equivalent component $V_{d2}(i, j)$ of the pixel (i, j) at the second operation temperature $T_{D2}$ and the first dark current equivalent component $V_{d1}(i, j)$ of the pixel (i, j) at the first operation temperature $T_{D1}$, from the pixel output voltage $V_{D2}(i, j)$ from the pixel (i, j) at the second operation temperature $T_{D2}$ thereby to convert the variation amount of the dark current equivalent component of each pixel (i, j) into the pixel output voltage $V_{D1}(i, j)$ of the pixels (i, j) at the first operation temperature $T_{D1}$ (step S9 of FIG. 7). Consequently, a pixel output voltage suitable for correction can be obtained using correction information before the operation temperature variation, namely, the first electric signal $V_1(i, j)$ and the second electric signal $V_2(i, j)$ acquired at the first operation temperature $T_{D1}$ and outputted from the infrared detector 10 when infrared rays having intensities equivalent to blackbodies of the first known temperature $T_1$ and the second known temperature $T_2$. It is to be noted that, if it is assumed that the sensitivity of the infrared detector 10 does not vary or can be ignored within an operation temperature range thereof, then the variation amount of the dark current equivalent component caused by the operation temperature variation is equal to that of the pixel output voltage caused by the operation temperature variation.

$$V_{D1}(i,j) = V_{D2}(i,j) - (V_{d2}(i,j) - V_{d1}(i,j))$$

In this manner, a variation of the electric signal outputted from the infrared detector caused by the operation temperature variation can be compensated for by the variation amount $(V_{d2}(i, j) - V_{d1}(i, j))$, including the first dark current equivalent component $V_{d1}(i, j)$, of the dark current equivalent component caused by the operation temperature variation when the operation temperature becomes the second operation temperature $T_{D2}$ after the operation temperature variation.

Thereafter, the calculation unit 41 of the signal calculation unit 25 performs the correction process for the pixel output voltage $V_{D1}(i, j)$ of each pixel (i, j) after the operation temperature compensation (after the conversion) to calculate a temperature T(i, j) of a portion of an imaging target corresponding to the pixel output voltage $V_{D1}(i, j)$ of the pixel (i, j) after the operation temperature compensation and then outputs the calculated temperature to the signal outputting unit 26 (step S9 of FIG. 7). Here, the reason why the correction process is performed for the pixel output voltage $V_{D1}(i, j)$ of each pixel (i, j) after the operation temperature compensation (after the conversion) is that, in the correction process, the first electric signal $V_1(i, j)$ and the second electric signal $V_2(i, j)$ acquired at the first operation temperature $T_{D1}$ and outputted from the infrared detector 10 when infrared rays having intensities corresponding to blackbodies of the first known temperature $T_1$ and the second known temperature $T_2$ are inputted are used.

The operation at step S8 and the operation at step S9 are repetitively performed for all pixels (step S10 of FIG. 7).

The signal outputting unit 26 generates, in accordance with the configuration of the infrared detection apparatus 1, a signal having an intensity in accordance with T(i, j), for example, as a contrast signal for a television image output, and outputs the generated signal to the display apparatus (step S11 of FIG. 7).

It is to be noted that, although the first dark current equivalent component (first dark current equivalent output voltage component) $V_{d1}(i, j)$ here of each pixel (i, j) at the first operation temperature $T_{D1}$ is successively calculated at step S9, treatment of the first dark current equivalent component $V_{d1}(i, j)$ is not limited to this. For example, the first dark current equivalent component $V_{d1}(i, j)$ may be calculated and stored into the data storage unit 24 in advance at the stage of step S6.

Further, although the correction process (correction operation) here is performed after the operation temperature compensation process (operation temperature compensation operation) is performed, the correction process is not limited to this. For example, in the correction process, correction may be performed taking a value (for example, a variation amount) indicative of a variation of the dark current equivalent component caused by the operation temperature variation into account. In particular, in the correction process, a coefficient to be used for calculating the temperature T(i, j) of a portion of an imaging target corresponding to the pixel output voltage V(i, j) of each pixel (i, j) may be changed in response to a value (for example, a variation amount) indicative of a variation of the dark current equivalent component caused by an operation temperature variation such that the correction process is performed using the changed coefficient. Also in such a case as just described, a variation of an electric signal outputted from the infrared detector caused an operation temperature variation is compensated for by a value, which includes the first dark current equivalent component calculated using the first electric signal and the second electric signal outputted from the infrared detector when infrared rays having intensities equivalent to blackbodies of the first known temperature and the second known temperature at the first operation temperature are inputted and indicates a variation of the dark current equivalent component caused by an operation temperature variation when the operation temperature becomes the second operation temperature after the operation temperature variation.

Further, although the operation temperature compensation process and the correction process here are performed in order for each pixel, the order of the processes is not limited to this. For example, the correction process may be performed for all pixels by performing the operation temperature compensation process in order for the pixels and performing the correction process in order for the pixels after the operation temperature compensation process is completed for all pixels.

Incidentally, in the embodiment described above, the operation temperature compensation arithmetic operation is successively executed in order to calculate $(V_{d2}(i, j) - V_{D1}(i, j))$ by the signal calculation unit 25.

However, for example, taking the arithmetic operation speed of the signal processor 4 into consideration, a method may be applied in which not $(V_{d2}(i, j) - V_{d1}(i, j))$ is calculated successively but $(V_{d2}(i, j) - V_{d1}(i, j))$ corresponding to each operation temperature $T_{D2}$ is calculated in advance and data obtained by the calculation are stored as a table indicating a corresponding relationship between $T_{D2}$ and $(V_{d2}(i, j) - V_{d1}(i, j))$ into the data storage unit 24.

An embodiment having such a configuration as just described is described below.

Figure 9:
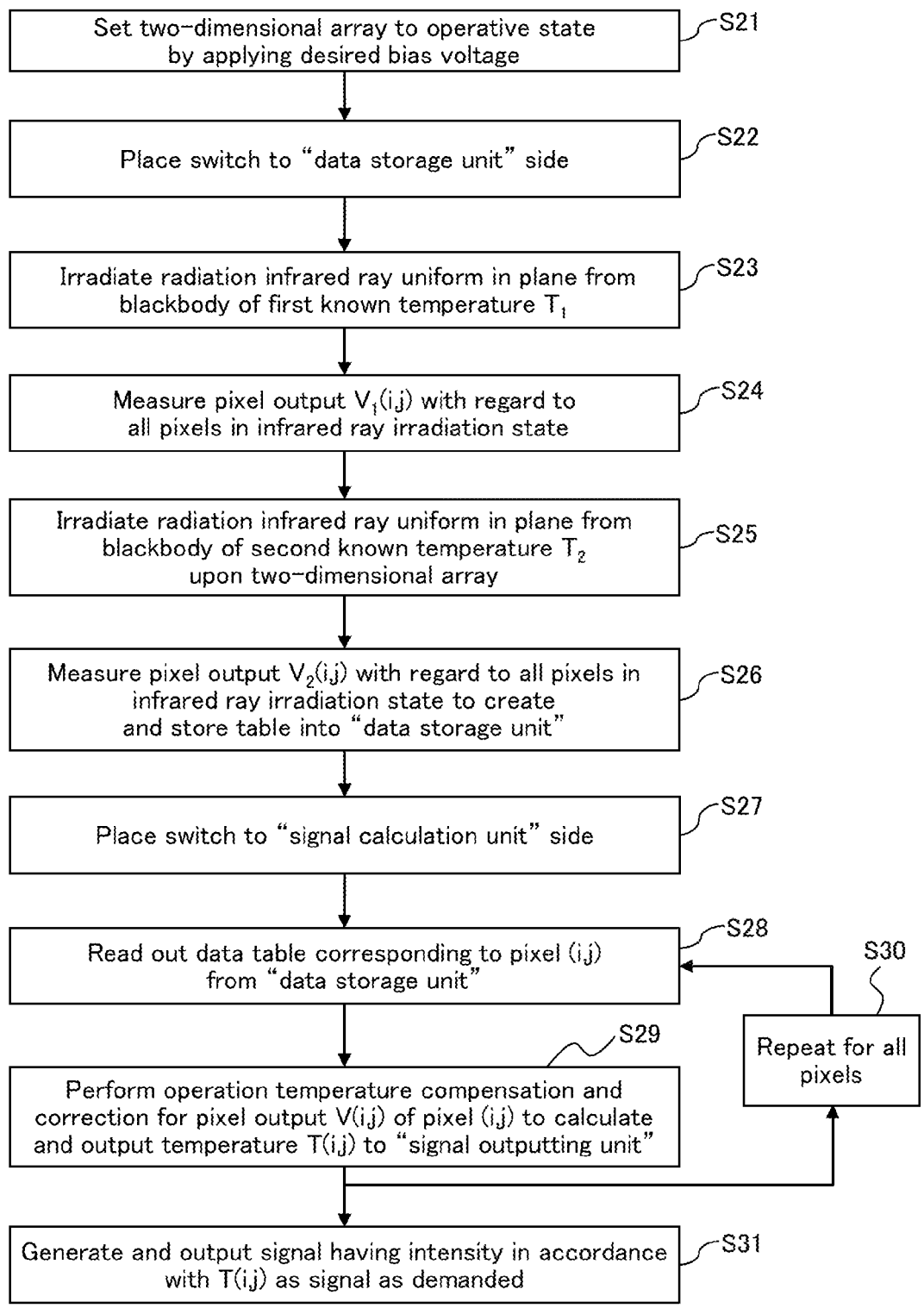
FIG. 9 is a flow chart illustrating a second example of an operation temperature compensation method and a correction method in the FPA type infrared imaging apparatus that is the example of the infrared detection apparatus according to the embodiment.

FIG. 9 is a flow chart illustrating a second embodiment of an operation temperature compensation method of an output electric signal from each infrared detector 10 in the infrared imaging apparatus 1. The operation temperature compensation method illustrated in FIG. 9 is described with reference to FIGS. 9 and 10. It is to be noted that, in the flow chart, the execution order of the steps is not limited to the order illustrated in the flow chart, but the execution order of the steps may be changed anyway if no trouble occurs with the operation.

First at step S21, the two-dimensional array 21 is set to an operative state in which a desired bias voltage is applied thereto. In other words, the two-dimensional array 21 is placed into a state in which a fixed bias voltage $V_{Ig}$ is applied to the infrared detectors 10 that configure pixels of the two-dimensional array 21.

At step S22, the switch 27 is coupled with the data storage unit 24 side.

At step S23, an infrared ray (infrared ray of an intensity equivalent to a blackbody of the temperature $T_1$) radiated from an object (infrared source) equivalent to a blackbody of the temperature $T_1$ is uniformly in a plane inputted to (irradiated on) the two-dimensional array 21.

At step S24, in the state in which the infrared ray is inputted, the row selection switch unit 22 and the signal extraction & shift register unit 23 are activated to acquire a pixel output voltage value $V_1(i, j)$ from each infrared detector 10. The output voltage values $V_1(i, j)$ are supplied from the signal extraction & shift register unit 23 to the data storage unit 24 and stored into the data storage unit 24.

Figure 10:
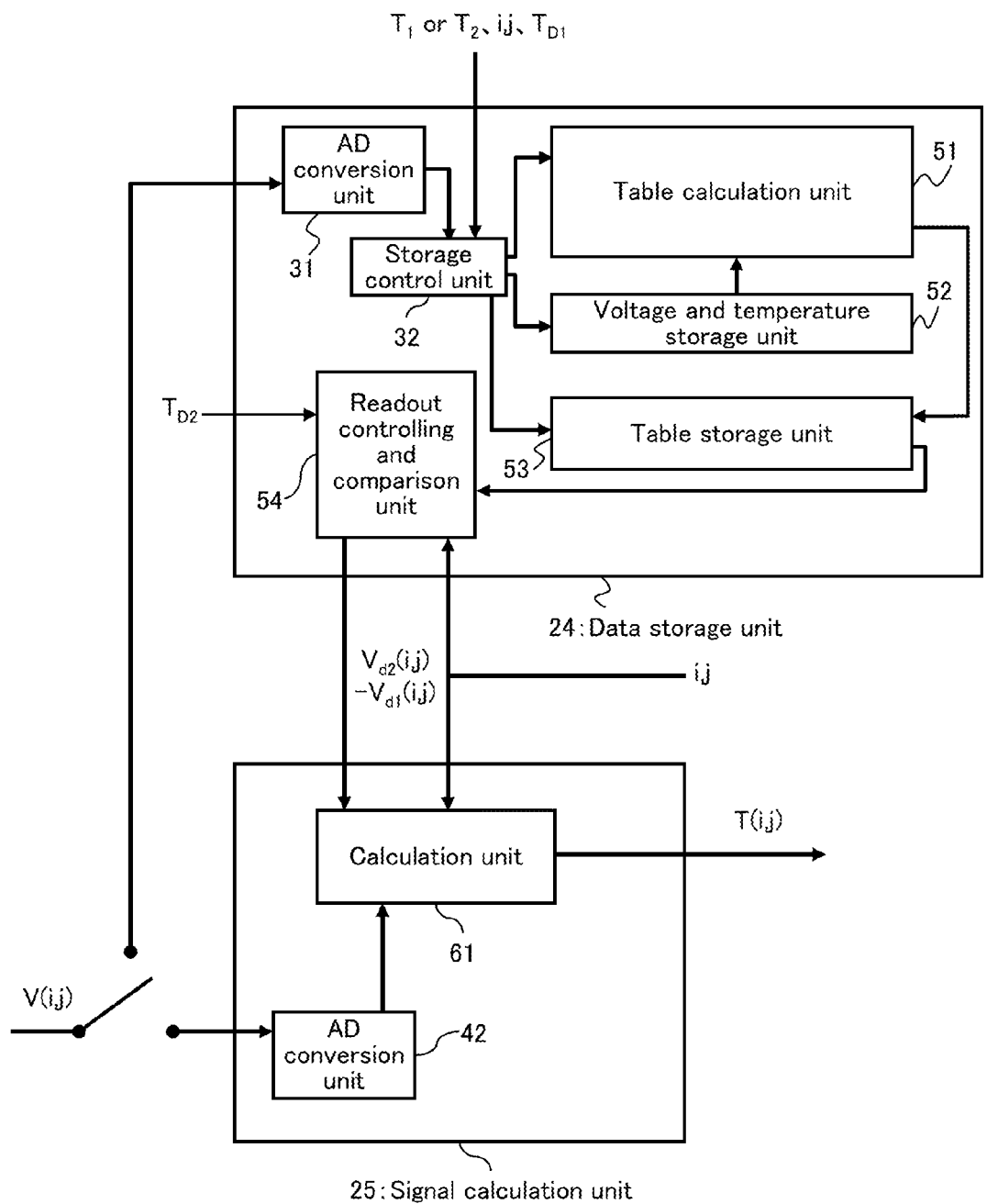
FIG. 10 is a view depicting an example of a configuration of a data storage unit and a signal calculation unit provided in a signal processor of the second example of the operation temperature compensation method and the correction method in the FPA type infrared imaging apparatus that is the example of the infrared detection apparatus according to the embodiment.

FIG. 10 is a view depicting an example of a configuration of the data storage unit 24 and the signal calculation unit 25.

The data storage unit 24 includes an AD conversion unit 31, a storage control unit 32, a table calculation unit 51, a voltage and temperature storage unit 52, a table storage unit 53 and a readout controlling and comparison unit 54. Further, the signal calculation unit 25 includes a calculation unit 61 and an AD conversion unit 42.

The AD conversion unit 31 converts an analog output voltage supplied from the signal extraction & shift register unit 23 into a digital voltage value.

To the data storage unit 24, data indicative of a pixel position (i, j) of the output voltage being currently supplied, data indicative of the temperature $T_1$ or $T_1$ of the infrared ray being currently inputted and an operation temperature (first operation temperature) $T_{D1}$ of the two-dimensional array 21 at this point of time are supplied.

The storage control unit 32 stores a digital voltage value after the AD conversion by the AD conversion unit 31 into the voltage and temperature storage unit 52. Thereupon, the digital voltage value is stored into a memory position corresponding to the pixel position (i, j). Further, the storage control unit 32 stores the temperature $T_1$ of the infrared source at present into the voltage and temperature storage unit 52.

Referring back to FIG. 9, at step S25, an infrared ray (infrared ray of an intensity of the temperature $T_2$ equivalent to a blackbody) irradiated from an object (infrared source) equivalent to a blackbody of the temperature $T_2$ is inputted to (radiated on) the two-dimensional array 21 uniformly in a plane.

At step S26, in the state in which the infrared ray is inputted, the row selection switch unit 22 and the signal extraction & shift register unit 23 are activated to acquire a pixel output voltage value $V_2(i, j)$ from each infrared detector 10 of the two-dimensional array 21. The output voltage value $V_2(i, j)$ is supplied from the signal extraction & shift register unit 23 to the data storage unit 24 and stored into the data storage unit 24.

In the data storage unit 24 depicted in FIG. 10, a digital voltage value obtained by AD conversion of the output voltage value $V_2(i, j)$ by the AD conversion unit 31 is stored into the voltage and temperature storage unit 52 by the storage control unit 32. Thereupon, the storage control unit 32 stores the digital voltage value into a memory position corresponding to the pixel position (i, j). Further, the storage control unit 32 stores the temperature $T_2$ of the infrared source at present into the voltage and temperature storage unit 52.

It is to be noted that the data acquisition process described above may be performed upon activation of the apparatus or when correction is performed. Especially, where correction is performed, since the data acquisition process described hereinabove is performed when correction is performed, there is no necessity to perform the above-described data acquisition process separately, but data acquired by the above-described data acquisition process when correction is performed may be used for the operation temperature compensation. However, the above-described data acquisition process may be performed separately from the above-described data acquisition process that is performed when correction is performed.

At step S26, using values of the data $V_1(i, j)$, $V_2(i, j)$, $T_1$ and $T_1$ corresponding to the pixels (i, j) stored in the voltage and temperature storage unit 52, x, $\lambda_p$ or $x\lambda_p$ acquired separately and so forth, a first dark current equivalent component $V_{d1}(i, j)$ of each pixel (i, j) at the first operation temperature $T_{D1}$ is determined by the following expression:

$$V_{d1}(i, j) = \frac{V_1(i, j)\exp\left(-\frac{hc}{x\lambda_p k_B T_2}\right) - V_2(i, j)\exp\left(-\frac{hc}{x\lambda_p k_B T_1}\right)}{\exp\left(-\frac{hc}{x\lambda_p k_B T_2}\right) - \exp\left(-\frac{hc}{x\lambda_p k_B T_1}\right)}$$

Further, using the first dark current equivalent component $V_{d1}(i, j)$, first operation temperature $T_{D1}$, a plurality of second operation temperatures $T_{D2}$ and function $h(T_D)$ representative of an operation temperature $T_D$ dependency of the dark current equivalent component, where the second dark current equivalent component (second dark current equivalent output voltage component) of each pixel (i, j) at the second operation temperature $T_{D2}$ is represented by $V_{d2}(i, j)$, the variation amount $V_{d2}(i, j)-V_{d1}(i, j)$ that is a value indicative of a variation of the dark current equivalent component of each pixel (i, j) caused by an operation temperature variation when the second operation temperature is reached after the variation of the operation temperature is calculated by $$V_{d2}(i, j) - V_{d1}(i, j) = V_{d1}(i, j)\left(\frac{h(T_{D2})}{h(T_{D1})} - 1\right)$$

or by an expression given below obtained by linearization of the expression given above in the proximity of the first operation temperature $T_{D1}$:

$$V_{d2}(i, j) - V_{d1}(i, j) = V_{d1}(i, j)\frac{h'(T_{D1})}{h(T_{D1})}(T_{D2} - T_{D1})$$

Then, a table indicating a corresponding relationship between the second operation temperatures $T_{D2}$ and ($V_{d2}(i, j)-V_{d1}(i, j)$) is generated and stored into the table storage unit 53.

Here, for a suitable interval [$T_{D2}(k)$, $T_{D2}(k)+\delta t$], an expression:

$$(V_{d2}(i, j) - V_{d1}(i, j))(k) = V_{d1}(i, j)\left(\frac{h(T_{D2}(k))}{h(T_{D1})} - 1\right)$$

or an expression given below obtained by linearizing the expression above in the proximity of the first operation temperature $T_{D1}$:

$$(V_{d2}(i, j) - V_{d1}(i, j))(k) = V_{d1}(i, j)\frac{h'(T_{D1})}{h(T_{D1})}(T_{D2}(k) - T_{D1})$$

is used to calculate $(V_{d2}(i, j)-V_{d1}(i, j))(k)$ for each interval for each pixel (i, j). Then, $(V_{d2}(i, j)-V_{d1}(i, j))(k)$ determined in this manner and $T_{D2}(k)$ are stored in an associated relationship with each other as a table into the table storage unit 53.

At step S27 of FIG. 9, the switch 27 is coupled with the signal calculation unit 25 side.

Consequently, the row selection switch unit 22 and the signal extraction & shift register unit 23 are activated in a state in which the fixed bias voltages $V_{fg}$ is applied to the infrared detectors 10 configuring the individual pixels to successively read out the pixel outputs V(i, j) from the pixels (i, j) of the two-dimensional array 21 into the signal calculation unit 25. Here, the operation temperature at this point of time (second operation temperature; operation temperature after the operation temperature variation) is represented by $T_{D2}$, and the pixel output from each pixel (i, j) at the operation temperature $T_{D2}$, is represented by $V_{D2}(i, j)$.

At step S28, the data are readout from the table stored in the table storage unit 53.

In particular, the AD conversion unit 42 of the signal calculation unit 25 converts the pixel output voltage $V_{D2}(i, j)$ from each pixel (i, j) from an analog voltage into a digital voltage and supplies the digital voltage value to the calculation unit 61. The readout controlling and comparison unit 54 acquires the operation temperature (second operation temperature) $T_{D2}$ at this point of time from the temperature sensor 70, and reads out the table stored in the table storage unit 53 on the basis of the data indicative of the pixel position (i, j) and the second operation temperature $T_{D2}$.

Then, the readout controlling and comparison unit 54 reads out ($V_{d2}(i, j)-V_{d1}(i, j)$) corresponding to the pixel position (i, j) and the second operation temperature $T_{D2}$ from the table and supplied to the calculation unit 61.

Here, ($V_{d2}(i, j)-V_{d1}(i, j)$)(k) corresponding to k that satisfies $$T_{D2}(k) \leq T_{D2} \leq T_{D2}(k)+\delta T$$

is read out from the table stored in the table storage unit 53 and supplied to the calculation unit 61.

At step S29, ($V_{d2}(i, j)-V_{d1}(i, j)$)(k), namely, the variation amount of the dark current equivalent component of each pixel (i, j) caused by an operation temperature variation, is subtracted from the pixel output voltage $V_{D2}(i, j)$ at the second operation $T_{D2}$ to convert the variation amount into a pixel output voltage $V_{D1}(i, j)$ of each pixel (i, j) at the first operation temperature $T_{D1}$. Namely, $$V_{D1}(i,j)=V_{D2}(i,j)-(V_{d2}(i,j)-V_{d1}(i,j))(k)$$

Then, a correction process is performed for the pixel output voltage $V_{D1}(i, j)$ of each pixel (i, j) after the operation temperature compensation (after the conversion) to determine a temperature T(i, j) of the portion of the imaging target corresponding to the pixel output voltage $V_{D1}(i, j)$ of each pixel (i, j) after the operation temperature compensation. Then, the determined temperature T(i, j) is outputted to the signal outputting unit 26.

The operation at step S28 and the operation at step S29 are repeated for all pixels (step S30).

The signal outputting unit 26 generates a signal of an intensity corresponding to T(i, j) described above as, for example, as a contrast signal of a television image output in response to the configuration of the infrared imaging apparatus 1 and outputs the contrast signal to the display apparatus (step S31).

Accordingly, with the infrared detection apparatus according to the present embodiment, there is an advantage that, even if the operation temperature varies, the electric signal outputted from the infrared detector 10 can be compensated for with high accuracy.

It is to be noted that also it is possible to take a countermeasure by performing acquisition of data for correction such as, for example, linear interpolation again cyclically or upon temperature variation. In this case, cyclically or upon temperature variation, for example, two infrared sources are used to input infrared rays of known intensities to an infrared detector again, whereupon an electric signal outputted from the infrared detector is acquired and correction of the electric signal by linear interpolation is performed. Therefore, within a period within which such correction is performed, detection of the infrared rays results in failure and wasteful time is spent. In contrast, when operation temperature compensation is performed in such a manner as in the embodiment described above, for example, correction such as linear compensation may be performed only once. Therefore, occurrence of wasteful time can be suppressed. Further, although the operation temperature is generally feedback controlled, even in a case in which the accuracy of the feedback control is not sufficiently high, such insufficiency can be compensated for by performing the operation temperature compensation of the embodiment described above.

Figure 11A:
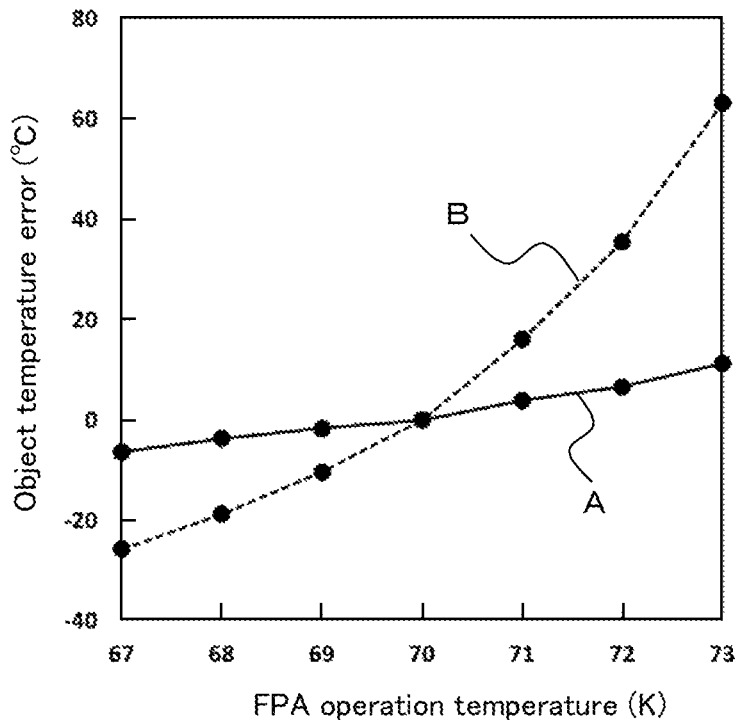
FIGS. 11A and 11B are views illustrating an advantageous effect by the operation temperature compensation method in the FPA type infrared imaging apparatus that is the example of the infrared detection apparatus according to the embodiment.
Figure 11B:
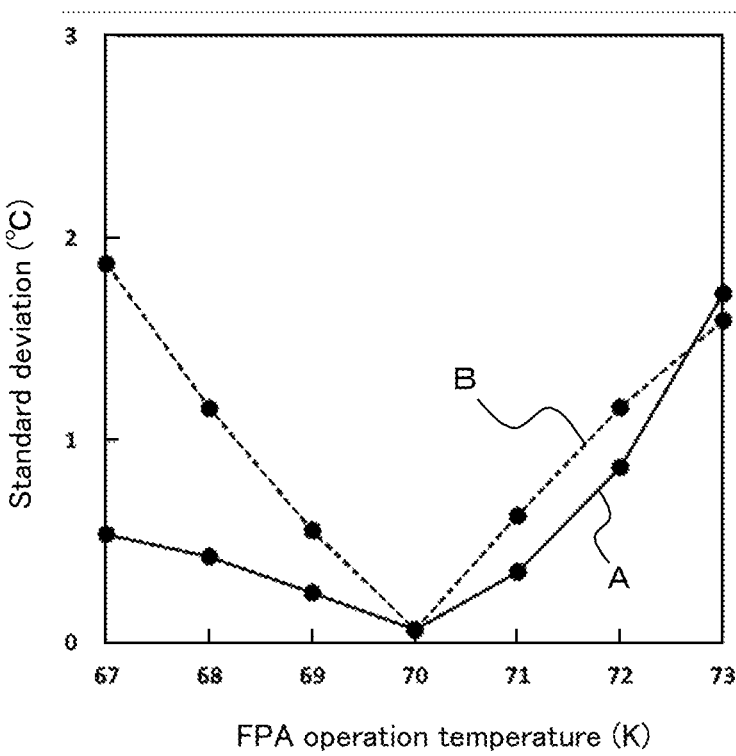

Here, FIGS. 11A and 11B are views illustrating advantageous effects when the operation temperature compensation of the embodiment described above (when operation temperature compensation and correction by linear interpolation is performed). It is to be noted that, in FIGS. 11A and 11B, a solid line A corresponds to a case in which the operation temperature compensation of the embodiment described above is performed while a broken line B corresponds to another case in which the operation temperature compensation of the embodiment described above is not performed (when only correction by linear interpolation is performed) for comparison. Further, FIG. 11A illustrates relationships between the operation temperature and the temperature error (average value of an error of a pixel output (by the heat source temperature conversion) with respect to a uniform infrared source of the temperature of 30° C.). Meanwhile, FIG. 11B illustrates relationships between the operation temperature and the standard deviation of the output error (variation) in the cases of FIG. 11A. It is to be noted that the first operation temperature $T_{D1}$ is 70 K.

From FIGS. 11A and 11B, it can be recognized that, when the operation temperature compensation of the embodiment described above is performed, the output variation by the operation temperature variation is suppressed and the variability of the output variation by the operation temperature variation arising from the variability in characteristic of the infrared detector 10 is suppressed in comparison with that in an alternative case in which the operation temperature compensation of the embodiment described above is not performed. In this manner, even in a case in which the operation temperature varies, the electric signal outputted from the infrared detector 10 can be compensated for with high accuracy.

It is to be noted that the present technology is not limited to the constitution clarified in the foregoing description of the embodiments but can be modified in various manners without departing from the spirit and scope of the technology.

For example, while, in the embodiments described above, the infrared imaging apparatus 1 that includes a plurality of infrared detectors 10 is taken as an example, the infrared detection apparatus is not limited to this, but the present technology can be applied also to an infrared detection apparatus that includes a single infrared detector. Also in this case, since the signal processor provided in the infrared detection apparatus performs operation temperature compensation for an electric signal outputted from the infrared detector, even if the operation temperature varies, the electric signal outputted from the infrared detector can be compensated for with high accuracy.

Further, for example, in the embodiments described above, various processes can be applied as the correction process. Usually, such a correction process as described below is applied. In particular, for example, two infrared sources are used, and infrared rays having intensities equivalent to blackbodies of known temperatures are inputted to an infrared detector. Then, electric signals outputted thereupon from the infrared detector are acquired, and assuming that the input and output characteristic of the infrared detector is linear between the two points, the electric signal outputted from the infrared detector when an infrared ray from a target object is inputted to the infrared detector is corrected by linear interpolation.

However, since actually the input and output characteristic of an infrared detector is not linear, correction displacement occurs, and this makes different in the infrared intensity obtained by correction of the electric signal outputted from the infrared detector (or the blackbody temperature equivalent to the infrared intensity) and the actual infrared intensity from the target object (or the blackbody temperature equivalent to the infrared intensity).

Figure 12:
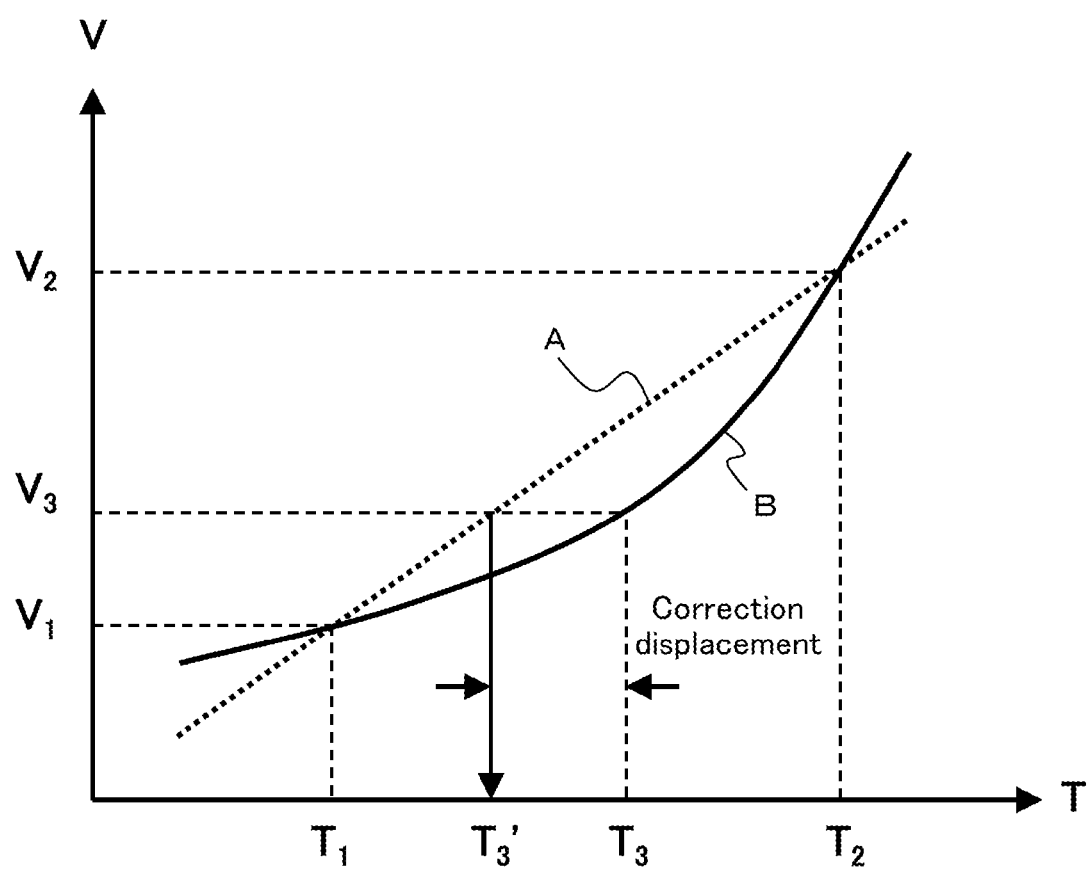
FIG. 12 is a view illustrating a subject when correction by linear interpolation is performed.

For example, as depicted in FIG. 12, an infrared ray of an intensity equivalent to a black body of the temperature $T_1$ is inputted to the infrared detector, and an electric signal $V_1$ outputted from the infrared detector at the time is acquired. Further, an infrared ray of an intensity equivalent to a blackbody of the temperature $T_2$ is inputted to the infrared detector, and an electric signal $V_2$ outputted from the infrared detector at this time is acquired. Then, if the electric signal outputted from the infrared detector when an infrared ray from a target object is inputted to the infrared detector is $V_3$, then from the input and output characteristic (refer to the solid line B in FIG. 12) of the actual infrared detector, it is determined that the temperature of the target object is $T_3$ and the electric signal outputted from the infrared detector is corrected correctly. However, if it is assumed that the input and output characteristic of the infrared detector is linear between the two points (refer to the broken line A in FIG. 12), then it is determined that the temperature of the target object is $T_3'$, and the electric signal outputted from the infrared detector will be corrected in error.

Here, when an electric signal outputted from the infrared detector is corrected assuming that the input and output characteristic of the infrared detector is linear, where the variation of the electric signal outputted from the infrared detector when the temperature variation is represented by $dT$ is represented by $dV_p$ and $a$ and $C$ represent a constant and a constant of integration, respectively, the electric signal outputted from the infrared detector is corrected on the basis of the following relational expression:

$$\frac{dV_p}{dT} = a \Leftrightarrow V_p = aT + C$$

Then, the situation that correction displacement occurs and correction is performed in error as described above arises from the fact that it is assumed that the input and output characteristic of the infrared detector is linear and the constant $a$ is used in the relational expression given above.

Therefore, it is preferable to make it possible to correct the electric signal outputted from the infrared detector with high accuracy in response to the input and output characteristic of the actual infrared detector.

For example, when the electric signals outputted from the infrared detector 10 when infrared rays of intensities equivalent to blackbodies of the known temperatures $T_1$ and $T_2$ ($T_1 > T_2$) are inputted are $V_1$ and $V_2$, respectively, preferably the signal processor 4 corrects the electric signal outputted from the infrared detector 10 by determining, using $V_0$ and $V_d$ determined by $$V_0 = \frac{V_2 - V_1}{\exp\left(-\frac{hc}{x\lambda_p k_B T_2}\right) - \exp\left(-\frac{hc}{x\lambda_p k_B T_1}\right)}$$

$$V_d = \frac{V_1 \exp\left(-\frac{hc}{x\lambda_p k_B T_2}\right) - V_2 \exp\left(-\frac{hc}{x\lambda_p k_B T_1}\right)}{\exp\left(-\frac{hc}{x\lambda_p k_B T_2}\right) - \exp\left(-\frac{hc}{x\lambda_p k_B T_1}\right)}$$

the temperature (unknown temperature) T ($T_2 \geq T \geq T_1$) of the target object by $$T = -\frac{\frac{hc}{x\lambda_p k_B}}{\text{Ln}\left(\frac{V - V_d}{V_0}\right)}$$

from the electric signal V outputted from the infrared detector 10. In other words, preferably the electric signal V outputted from the infrared detector in response to the infrared ray (infrared light) from the target object (imaging target object) of an arbitrary unknown temperature T is corrected appropriately using the expression given above to calculate the temperature T (temperature by the blackbody conversion: T is the absolute temperature).

By performing the correction in this manner, when two-point correction in which two measurement points measured by inputting infrared rays from two infrared sources of known intensities (known temperatures) are used is performed, in order to perform interpolation between the two measurement points, a correction curve in accordance with the input and output characteristic of the infrared detectors 10 is used to correct the electric signal outputted from the infrared detector 10. Therefore, the electric signal outputted from the infrared detector 10 when an infrared ray is inputted from the target object can be corrected with high accuracy in accordance with the input and output characteristic of the actual infrared detector 10, and an electric signal corresponding to a temperature (intensity) of an infrared ray of an unknown intensity (unknown temperature) can be obtained with high accuracy.

Further, while, in the embodiments described above, the temperature T of a target object is determined from the electric signal V outputted from the infrared detector 10 to correct the electric signal outputted from the infrared detector 10, processing of the electric signal is not limited to this. In particular, although the signal calculation unit 25 determines the temperature T of a target object from the electric signal V outputted from the infrared detector 10 and the signal outputting unit 26 generates a signal of an intensity corresponding to the temperature T, for example, as a contrast signal of a television image output and outputs the signal to the display apparatus, processing of the electric signal is not limited to this. For example, the signal calculation unit may generate a signal of an intensity in accordance with the temperature T of a target object from the electric signal V outputted from the infrared detector, for example, as a contrast signal of a television image output and output the signal to the display apparatus. In other words, without determining the temperature T of the target object (blackbody temperature corresponding to the light amount of the input infrared ray), for example, a contrast signal of a television image output may be generated on the basis of a corresponding relationship between the temperature T of the target object and the intensity of, for example, a contrast signal of a television image signal from the electric signal V outputted from the infrared detector 10 and output the contrast signal to the display apparatus.

Incidentally, separate from the technique that involves approximation as in the embodiments described above, a technique may be applied wherein the form of $$f(T) = \frac{\int_{\lambda_1}^{\lambda_2} R_0(\lambda) \frac{\partial W}{\partial T} d\lambda}{\int_{\lambda_1}^{\lambda_2} R_0(\lambda) W(\lambda, T) d\lambda}$$

is evaluated numerically, for example, from the Planck's formula of radiation and this is approximated with a suitable function g(T).

Here, for the function g(T), an arbitrary function that can be handled mathematically such as a first-or more-order integral function or exponential function of the temperature T can be used in principle.

In this case, the relationship of the output electric signal V(T) of the infrared detector to the temperature T of the target object is given, similarly as described hereinabove, by $$V = V_D + V_d = V_0 \exp\{G(T)\} + V_d$$

Here, the function G(T) is one of primitive functions of the function g(T), namely, is:

$$G(T) = \int g(T) dT$$

In this case, the unknown coefficient $V_d$ can be determined in the following manner.

First, if the electric signal $V_1$ outputted with respect to the known temperature $T_1$ is substituted into the expression given above and the electric signal $V_2$ outputted with respect to the known temperature $T_2$ is substituted into the expression given above, then the two following expressions are obtained:

$$V_1 = V_0 \exp\{G(T_1)\} + V_d$$

$$V_2 = V_0 \exp\{G(T_2)\} + V_d$$

Then, the upper side expression from between the two expressions above is multiplied by $$\exp\{G(T_2)\}$$

and the lower side expression is multiplied by $$\exp\{G(T_1)\}$$

Then, by subtracting the two expressions obtained in this manner at both sides, the unknown coefficient $V_d$ can be determined in the following manner:

$$V_1 \exp\{G(T_2)\} = V_0 \exp\{G(T_1)\}\exp\{G(T_2)\} + V_d \exp\{G(T_2)\}$$

$$V_2 \exp\{G(T_1)\} = V_0 \exp\{G(T_1)\}\exp\{G(T_2)\} + V_d \exp\{G(T_1)\}$$

$$\therefore V_1 \exp\{G(T_2)\} - V_2 \exp\{G(T_1)\} = V_d [\exp\{G(T_2)\} - \exp\{G(T_1)\}]$$

$$\therefore V_d = \frac{V_1 \exp\{G(T_2)\} - V_2 \exp\{G(T_1)\}}{\exp\{G(T_2)\} - \exp\{G(T_1)\}}$$

Similarly, also the unknown coefficient $V_0$ can be determined in the following manner:

$$V_0 = \frac{V_2 - V_1}{\exp\{G(T_2)\} - \exp\{G(T_1)\}}$$

Incidentally, the unknown coefficient $V_d$ can be determined in such a manner as described above. Therefore, the signal processor 4 can determine the first dark current equivalent component $V_{d1}$ of an electric signal outputted from the infrared detector 10 at the first operation temperature, using the first electric signal $V_1$ and the second electric signal $V_2$ outputted from the infrared detector 10 when infrared rays of intensities equivalent to blackbodies of the first known temperature $T_1$ and the second known temperature $T_2$ ($T_2 > T_1$) are inputted at the first operation temperature, by $$V_{d1} = \frac{V_1 \exp\{G(T_2)\} - V_2 \exp\{G(T_1)\}}{\exp\{G(T_2)\} - \exp\{G(T_1)\}}$$

Also in this case, similarly as in the first embodiment described above, the signal processor 4 determines the first dark current equivalent component from a relational expression in which not a constant but a function of the temperature (namely, a function that uses the temperature as a variable) is included at a portion thereof relating to the dependency of the infrared intensity on the temperature.

Here, the relational expression is represented, where the electric signal equivalent to the intensity of the infrared ray outputted from the infrared detector 10 is represented by $V_p$ and the variation of the electric signal equivalent to the intensity of the infrared ray outputted from the infrared detector 10 where the temperature variation is represented by dT is represented by $dV_p$ and besides the portion relating to the dependency of the infrared intensity on the temperature is represented by g(T) that is a function of the temperature T (function including T as a variable), by an expression given below. It is to be noted that the function g(T) is hereinafter referred to sometimes as function representative of the dependency of the infrared intensity on the temperature.

$$\frac{dV_p}{dT} = g(T)V_p$$

In short, the signal processor 4 determines the first dark current equivalent component $V_{d1}$, using a function G(T) defined by $$G(T) = \int g(T) dT$$

where g(T) is the function of the temperature T included in the portion of the relational expression relating to the dependency of the infrared intensity on the temperature, by $$V_{d1} = \frac{V_1 \exp\{G(T_2)\} - V_2 \exp\{G(T_1)\}}{\exp\{G(T_2)\} - \exp\{G(T_1)\}}$$

where $T_1$ is the first known temperature, $T_2$ is the second known temperature ($T_2 > T_1$), $V_1$ is the first electric signal and $V_2$ is the second electric signal.

Incidentally, if it is assumed that g(T) is a primary function, namely, $$g(T) = aT + b, a \neq 0$$

then $$G(T) = \frac{1}{2}aT^2 + bT$$

is obtained.

On the other hand, for example, if g(T) is an exponential function, namely, $$g(T) = a \exp(bT), a \neq 0$$

then $$G(T) = \frac{a \exp(bT)}{b}$$

is obtained.

Incidentally, where an application function g(T) of such a function f(T) as given above is used, if a function including x(T) that satisfies a relationship given by $$g(T) = -\frac{hc}{\lambda_p k_B} \frac{d}{dT}\left(\frac{1}{x(T)T}\right)$$

is considered, then since $$G(T) = \int g(T) dT = -\frac{hc}{\lambda_p k_B} \int \frac{d}{dT}\left(\frac{1}{x(T)T}\right) dT = -\frac{hc}{x(T)\lambda_p k_B T}$$

is satisfied, $$V = V_p + V_d = V_0 \exp\left(-\frac{hc}{x(T)\lambda_p k_B T}\right) + V_d$$

is satisfied.

If this is compared with the expression of $V_{DC}$ of the embodiment described hereinabove, mathematically the technique that uses the function g(T) described above effectively corresponds to a case in which the constant x in the expression of $V_{DC}$ in the embodiment described hereinabove takes into account the dependency of the target object on the temperature T. In particular, where the function g(T) is such as given above, this corresponds to that, while, in the embodiment described hereinabove, the function f(T) approximated using the real constant x is used, the function g(T) approximated using the function x(T) of the temperature T is used. Also it is possible to consider that this is a result of approximation to the form of $$f(T) \approx g(T) = \frac{1}{xT^2} \frac{hc}{\lambda_p k_B}$$

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An infrared detection apparatus, comprising:
   an infrared detector configured to output an electric signal corresponding to an inputted infrared ray; and
   a signal processor configured to compensate for a variation of the electric signal, which is outputted from the infrared detector, caused by variation of an operation temperature with a value indicating a variation of a dark current equivalent component by the operation temperature variation when becoming a second operation temperature after the operation temperature variation, the dark current equivalent component including a first dark current equivalent component calculated using a first electric signal and a second electric signal outputted from the infrared detector when infrared rays having intensities equivalent to blackbodies of a first known temperature and a second known temperature are inputted at a first operation temperature.

2. The infrared detection apparatus according to claim 1, wherein the signal processor calculates the first dark current equivalent component from a relational expression in which not a constant but a function of a temperature is included in a portion relating to dependency of the infrared intensity on the temperature.

3. The infrared detection apparatus according to claim 2, wherein a function f(T) of a temperature T included in the portion of the relational expression relating to the dependency of the infrared intensity on the temperature is represented, where a peak wavelength in a wavelength response characteristic of the infrared detector is represented by λp, a real coefficient is represented by x, the Boltzmann's constant is represented by $k_B$, the Planck's constant by h and an a speed of light in vacuum is represented by c, by $$f(T) = \frac{hc}{x\lambda_p k_B T^2}$$

4. The infrared detection apparatus according to claim 3, wherein the real coefficient x is within a range of $$\frac{hc}{\lambda_p k_B T} > 1$$

with respect to the temperature T that satisfies $$1 - \frac{3FWHM}{2\mathrm{Ln}(2)\lambda_p} \leq x \leq 1 + \frac{3FWHM}{2\mathrm{Ln}(2)\lambda_p}$$

where FWHM represents the full width at half maximum in the wavelength response characteristic of the infrared detector.

5. The infrared detection apparatus according to claim 1, wherein the signal processor calculates the first dark current equivalent component $V_{d1}$, where the first known temperature is represented by $T_1$, the second known temperature by is represented by $T_2$ ($T_2 > T_1$), the first electric signal is represented by $V_1$ and the second electric signal is represented by $V_2$, by $$V_{d1} = \frac{V_1 \exp\left(-\frac{hc}{x\lambda_p k_B T_2}\right) - V_2 \exp\left(-\frac{hc}{x\lambda_p k_B T_1}\right)}{\exp\left(-\frac{hc}{x\lambda_p k_B T_2}\right) - \exp\left(-\frac{hc}{x\lambda_p k_B T_1}\right)}$$

6. The infrared detection apparatus according to claim 2, wherein the signal processor calculates the first dark current equivalent component $V_{d1}$ by $$G(T) = \int g(T) dT$$

where $T_1$ represents the first known temperature, $T_2$ ($T_2 > T_1$) represents the second known temperature $V_1$ represents the first electric signal and $V_2$ represents the second electric signal, using a function $G(T)$ defined by $$V_{d1} = \frac{V_1 \exp\{G(T_2)\} - V_2 \exp\{G(T_1)\}}{\exp\{G(T_2)\} - \exp\{G(T_1)\}}$$

where $g(T)$ represents a function of the temperature T included in the portion of the relational expression relating to the dependency of the infrared intensity on the temperature.

7. The infrared detection apparatus according to claim 1, wherein the signal processor calculates a value $V_{d2} - V_{d1}$ indicating a variation of the dark current equivalent component by the operation temperature variation by $$V_{d2} - V_{d1} = V_{d1} \left( \frac{h(T_{D2})}{h(T_{D1})} - 1 \right)$$

where $h(T_D)$ represents a function representing an operation temperature $T_D$ dependency of the dark current equivalent component, $T_{Di}$ represents the first operation temperature, $T_{D2}$ represents the second operation temperature and $V_{d2} - V_{d1}$ represents a value indicating a variation of the dark current equivalent component by the operation temperature variation, or by $$V_{d2} - V_{d1} = V_{d1} \frac{h'(T_{D1})}{h(T_{D1})} (T_{D2} - T_{D1})$$

which is a linearized form of the former expression in the proximity of the first operation temperature $T_{D1}$.

8. The infrared detection apparatus according to claim 7, wherein the function $h(T_D)$ representing the operation temperature $T_D$ dependency of the dark current equivalent component is represented by $$h(T_D) = \exp\left(-\frac{E_a}{k_B T_D}\right)$$

where $E_a$ represents activation energy of the dark current.

9. The infrared detection apparatus according to claim 7, wherein the function $h(T_D)$ representing the operation temperature $T_D$ dependency of the dark current equivalent component is represented by $$h(T_D) = T_D \exp\left(-\frac{E_a}{k_B T_D}\right)$$

where $E_a$ represents activation energy of the dark current.

10. The infrared detection apparatus according to claim 7, wherein the function $h(T_D)$ representing the operation temperature $T_D$ dependency of the dark current equivalent component is a function determined using a dark current equivalent component calculated using the first electric signal and the second electric signal outputted from the infrared detector when infrared rays having the intensities equivalent to blackbodies of the first known temperature and the second known temperature are inputted at an operation temperature and a different dark current equivalent component calculated using the first electric signal and the second electric signal outputted from the infrared detector when infrared rays having the intensities equivalent to blackbodies of the first known temperature and the second known temperature are inputted at a different operation temperature.

* * * * *